(12) United States Patent
Stoianovici et al.

(10) Patent No.: US 8,403,675 B2
(45) Date of Patent: Mar. 26, 2013

(54) DEVICE AND METHOD FOR MEDICAL TRAINING AND EVALUATION

(75) Inventors: Dan Stoianovici, Baltimore, MD (US); Dumitru Mazilu, Lutherville, MD (US); Alexandru Patriciu, Baltimore, MD (US); Louis R. Kavoussi, Lutherville, MD (US)

(73) Assignee: The Johns Hopkins University, Baltimore, MD (US)

( * ) Notice: Subject to any disclaimer, the term of this patent is extended or adjusted under 35 U.S.C. 154(b) by 114 days.

(21) Appl. No.: 11/075,835

(22) Filed: Mar. 8, 2005

(65) Prior Publication Data

US 2005/0214727 A1 Sep. 29, 2005

Related U.S. Application Data

(60) Provisional application No. 60/551,090, filed on Mar. 8, 2004.

(51) Int. Cl.
G09B 23/28 (2006.01)

(52) U.S. Cl. .......................... 434/262; 434/267; 434/272

(58) Field of Classification Search .................. 434/262, 434/265, 267, 269, 275, 268, 274
See application file for complete search history.

(56) References Cited

U.S. PATENT DOCUMENTS

| | | | | |
|---|---|---|---|---|
| 2,971,272 A * | 2/1961 | Barlow | ........................ | 434/272 |
| 4,167,070 A | 9/1979 | Orden | | |
| 4,850,876 A * | 7/1989 | Lutaenko et al. | ............. | 434/265 |
| 5,061,187 A * | 10/1991 | Jerath | ........................... | 434/262 |
| 5,236,363 A * | 8/1993 | Sandrik et al. | ................ | 434/267 |
| 5,295,694 A * | 3/1994 | Levin | ............................ | 273/447 |
| 5,403,191 A * | 4/1995 | Tuason | ......................... | 434/262 |
| 5,411,437 A * | 5/1995 | Weber et al. | ................... | 434/269 |
| 5,584,701 A | 12/1996 | Lampotang et al. | | |
| 5,597,310 A * | 1/1997 | Edde | ............................. | 434/272 |
| 5,803,746 A * | 9/1998 | Barrie et al. | .................. | 434/267 |
| 5,947,744 A * | 9/1999 | Izzat | ............................. | 434/272 |
| 5,975,748 A | 11/1999 | East, IV et al. | | |
| 6,336,812 B1 * | 1/2002 | Cooper et al. | ................. | 434/267 |
| 6,398,557 B1 * | 6/2002 | Hoballah | ...................... | 434/272 |
| 6,428,323 B1 * | 8/2002 | Pugh | ............................ | 434/274 |
| 6,488,507 B1 * | 12/2002 | Stoloff et al. | .................. | 434/272 |
| 6,626,916 B1 * | 9/2003 | Yeung et al. | ................... | 606/139 |
| 6,659,776 B1 * | 12/2003 | Aumann et al. | ............... | 434/262 |
| 6,910,896 B1 | 6/2005 | Owens et al. | | |
| 2001/0019818 A1 * | 9/2001 | Yong | ............................ | 434/262 |
| 2003/0091967 A1 * | 5/2003 | Chosack et al. | .............. | 434/262 |

(Continued)

OTHER PUBLICATIONS

See, W. A., et al., "Predictors of Laparoscopic complications after formal training in laparoscopic surgery," *JAMA*, vol. 270, 2689 (1993).

(Continued)

*Primary Examiner* — Kang Hu
*Assistant Examiner* — Bruk Gebremichael
(74) *Attorney, Agent, or Firm* — Edwards Wildman Palmer LLP; Peter F. Corless; Lisa Swiszcz

(57) ABSTRACT

A training and/or evaluating device is provided particularly useful in performing laparoscopic procedures, radiological procedures, and precise surgeries that simulates the structure and dynamic motion of the corresponding anatomical structure on which the procedure takes place. The device includes an outer housing, which may be designed to mimic the body wall, in which one or more organs are located. Motion of the organ(s), as a result of respiration, pulmonary action, circulation, digestion and other factors present in a live body, is simulated in the device so as to provide accurate dynamic motion of the organs during a procedure.

24 Claims, 13 Drawing Sheets

U.S. PATENT DOCUMENTS

| | | | |
|---|---|---|---|
| 2003/0186203 A1* | 10/2003 | Aboud | 434/262 |
| 2004/0033476 A1* | 2/2004 | Shun | 434/262 |
| 2004/0126746 A1* | 7/2004 | Toly | 434/262 |
| 2005/0211889 A1 | 9/2005 | Varchena et al. | |
| 2007/0003917 A1* | 1/2007 | Kitching et al. | 434/272 |

OTHER PUBLICATIONS

Fahlenkamp, D., et al., "Complications of Laparoscopic Procedures in Urology: Experience with 2,407 Procedures at 4 German Centers," *Journal of Urology*, vol. 162, 765 (1999).

Mughal, M., "A cheap laparoscopic surgery trainer", *Ann R Coll Surg Engl*, vol. 74, 256 (1992).

Munro, A., et al., "A laparoscopic surgical simulator", *J.R. Coll. Surg. Edimb.*, vol. 39, 176 (1994).

Kopchok, G., et al. "Endoscopic Surgery Training: Application of an In Vitro Trainer and In Vivo Swine Model", *Journal of Investigative Surgery*, vol. 6, p. 329 (1993).

SIMULAB Products Page http://www.simulab.com.

Wilson, M. S., et al., "MIST VR: a virtual reality trainer for laparoscopic surgery assessses performance," *Ann R Coll Sur Engl*, vol. 79, 403 (1997).

Gallagher, A. G., et al., "Virtual reality training in laparoscopic surgery: A preliminary assessment of minimally invasive surgical trainer virtual reality (MIST VR)", *Endoscopy*, vol. 31, 310 (1999).

Kneebone, R., "Simulation in surgical training: educational issues and practical implications," *Medical Education*, vol. 37, 267 (2003).

Ahlberg, G., et al., "Does training in a virtual reality simulator improve surgical performance?", *Surg Endosc*, vol. 16, 126 (2002).

Phantoms Improving the science of medical imaging and radiation therapy, *CIRS Tissue Simulation & Phantom Technology*, (2005).

The National Library of Medicine's Visible Human Project, The Visible Human Project®, http://www.nlm.nih.gov/research/visible/visible_human.html (May 23, 2005).

CIRS, Inc., Tissue Simulation Technology, http://www.cirsinc.com/overview.html (Mar. 3, 1995).

* cited by examiner

Section A

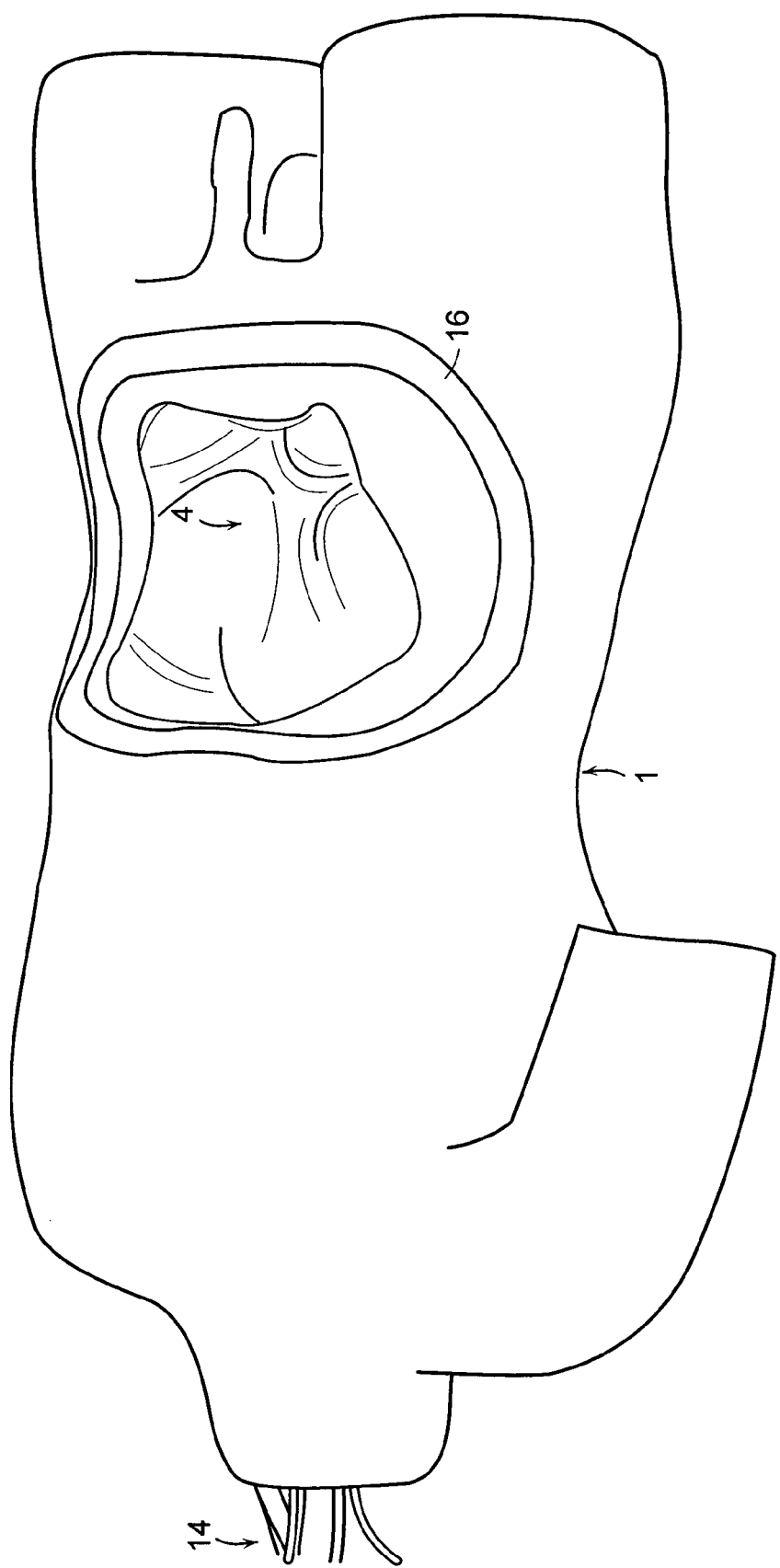

DEVICE AND METHOD FOR MEDICAL TRAINING AND EVALUATION

The present application claims the benefit of U.S. provisional application No. 60/551,090 filed Mar. 8, 2004, which is incorporated herein by reference in its entirety.

FIELD OF INVENTION

In one aspect, the present invention relates to devices and methods for performing and evaluating surgical and other medical treatment procedures, including anatomical structures and methods for use in training and evaluating individuals in laparascopic surgeries. The devices and methods may further be used in training and evaluation of non-laparascopic surgeries, particularly those that require precision and are complicated by the dynamic motion of the organs and body parts acted upon during the procedure. The devices and methods may further be used in radioscopic training and evaluation. In preferred aspects, devices of the invention can mimic anatomical, dynamic and/or mechanical properties of that area of the human anatomy on which training and evaluation is being performed.

BACKGROUND OF THE INVENTION

Laparoscopic surgeries are performed by inserting laparoscopic tubes and sleeves into the body through small incisions. Various instruments and a video camera (laparoscope) are then introduced into the body via the tubes and sleeves for performing and monitoring the surgery. The laparoscope and instruments allow the surgeon to explore the entire body cavity without making large standard openings, dividing skin and muscle, to access the cavity. The tubes and sleeves have diameters in the order of 10 millimeters and, thus, laparoscopic procedures require only small incisions to access the surgical site. These incisions significantly reduce the trauma and the required healing compared to traditional surgery, resulting in decreased hospitalization and patient morbidity, lower analgesic dosages for pain control, better aesthetic results and faster recovery. Such procedures can be used in a wide variety of procedures, such as urologic, gynecological, chest and abdomen surgeries.

For example, in a conventional laparascopic technique on the abdomen, a Veress needle is first inserted through the patient's abdominal wall and gas, usually carbon dioxide, is then injected through the needle to pressurize the abdominal cavity and distend the abdominal wall (insufflation). A pressure regulator gas insufflator is typically connected to the needle so that the pressure obtained does not go beyond 15 mmHg. Five or six small (5-10 mm) incisions are then made in the abdomen. The laparoscope and surgical instruments are inserted through these incisions, typically through laparoscopic tubes and sleeves, into the inflated abdominal cavity. The surgeon is then guided by the laparoscope, which transmits a picture of the internal organs on a video monitor.

Due to its complexity, however, laparoscopic surgical complications correlate highly to the level of surgeon experience (W. A. Cooper, C. S. Fischer, R. J., *Predictors of laparoscopic complications after formal training in laparoscopic surgery*, JAMA, 270: 2689, 1993). Further, the difficulty of laparoscopy in general, the high complexity of urological applications, and the relatively infrequent incidence of urologic cases make it essential for urologists to have access to specialized training programs. To meet this demand, numerous urologic laparoscopy programs and short courses have been established (Fahlenkamp, D., Rassweiler, J., Fornara, P. et al., *Complications of Laparoscopic Procedures in Urology: Experience with 2, 407 Procedures at 4 German Centers*, Journal of Urology, 162: 765, 1999). Training programs use a sequence of theoretical, simulator and animal training followed by mentored surgery, whereas short courses address only the first three of these steps. Laparoscopy simulators can be classified as either physical devices of various construction or virtual reality (VR) simulators.

Traditional training devices present box architecture with flexible trocar entry ports. For example, a box trainer designed for basic inverted-motion laparoscopy training was developed (Muhgal, M. *A cheap laparoscopic surgery trainer*, Ann R Coll Surgery, England, 74: 256, 1992). Box trainers that allow trocar placement and abdominal insufflation were also reported (Monro, A., Park, K., Atkinsori, D. et al., *A laparoscopic surgical simulator*, J. R. Coll. Surg. Edimb., 39: 176, 1994; Kopchok, G., Cavaye, D., Klein, S. et al., *Endoscopic Surgery Training: Application of an In Vivo Trainer and In Vivo Swine Model*, Journal of Investigative Surgery, 6: 329, 1993). Seattle's Simulab Corporation, along with the University of Washington Center of Videoendoscopic Surgery, provide a simulator with the purpose of replacing live-animal training. This simulator comprises a synthetic body model and procedure-specific packs and allows trainees to introduce surgical instruments and practice laparoscopy skills on simulated latex organs with standard instruments and laparoscopes. Specific procedure packs are available for general laparoscopic training in the initial phase for acquiring through-the-hole, inverted manipulation skills, depth perception under monitor vision, and hand-eye coordination, but fail to give a realistic anatomical perspective.

Recently, several virtual reality (VR) surgical simulators have become available. These trainers use a computer modeled human body and laparoscopic-like input devices (haptic interface) through which the trainee interacts with the model to perform specific surgical procedures. For example, MIST-VR is a laparoscopic trainer developed by Virtual Presence allowing the simulation of several laparoscopic procedures (Wilson, M. S., Middlebrook, A., Sutton, C. et al., *MIST-VR: a virtual reality trainer for laparoscopic surgery assesses performance*, Annals of the Royal College of Surgeons of England, 79: 403, 1997; Gallagher, A. G., McClure, N., McGuigan, J. et al., *Virtual reality training in laparoscopic surgery: A preliminary assessment of minimally invasive surgical trainerreality (MIST VR)*, Endoscopy, 31: 310, 1999). While VR simulators potentially can provide training alternative, their application and utility is presently limited due to the high complexity required to realistically model human organs (Kneebone, R. *Simulation in surgical training: educational issues and practical implications*, Medical Education, 37: 267, 2003; Ahlberg, G., Heikkinen, T., Iselius, L. et al., *Does training in a virtual reality simulator improve surgical performance*? Surg Endosc, 16: 126, 2002).

The use of live animals, while more realistic with respect to tissue properties, is limited by its high cost and animal death rate, especially at the beginning of the learning curve. In addition, the use of a live animal provides a limited period of time within which to one can practice surgical skills. Still further, animals present different anatomy and organ situs than humans.

Various simulation approaches also have been employed in various imaging therapies and diagnostics, including for training and assessment of magnetic resonance imaging, various nuclear medicine therapies, and ultrasound procedures. Computerized Imaging Reference Systems, Inc. (Norfolk Va.) markets certain devices for those simulation applications.

It would be desirable to have new devices and methods for medical personnel residents to increase their level of experience in performing various surgical and imaging procedures including laparoscopic procedures.

SUMMARY OF THE INVENTION

The present invention features a device and method for use in training and evaluating various medical procedures, particularly laparoscopic procedures, radioscopic procedures and procedures requiring precision that may be impacted by the dynamic motion of the organs, tissues and various body parts involved in or affecting the procedure.

In one embodiment, the present invention features a medical training and/or evaluation device comprising a housing, an organ or tissue element, and apparatus for simulating respiration and/or pulmonary action on the organ or tissue element. In one preferred embodiment, the apparatus simulates respiration action and/or pulmonary force action of a human. As referred to herein, "simulate" or other similar term means to create a representation or model of, particularly to imitate. Preferably, the apparatus exerts on the organ or tissue element a force with a plurality of degrees of freedom. As referred to herein, a "plurality of degrees of freedom" or other similar term refers to the minimum number of coordinates required to specify completely the motion of a particular element. In particular, when used in connection with a particular anatomical structure, it is preferred that the corresponding structure in the present invention possess the same number of degrees of freedom as the corresponding real anatomical structure. Thus, for example, if the heart (synthetic or real) is located within the present device, then it would be located in a manner that would provide it with the same number of degrees of freedom as the heart in a live body.

The housing can correspond to any simple geometric shape, for example, a box element/box-like shape. As used herein, a "box element" or other similar term includes any geometric shape having a base and typically four sides that suitably may be substantially perpendicular to the base. A box element may or may not include a lid or cover. In some embodiments, the housing is the shape of at least a portion of a mammalian anatomy, preferably a human anatomy. As used herein, "mammalian" or other similar term includes any of the various warm-blooded vertebrate animals of the class Mammalia, including primates particularly humans. It is also contemplated that the housing may be provided in the shape of other living beings other than mammals such as, for example, fish (cold-blooded aquatic vertebrates of the superclass Pisces), reptiles (cold-blooded, usually egg-laying vertebrates of the class Reptilia) and birds (warm-blooded, egg-laying, feathered vertebrates of the class Aves). The housing preferably comprises one or more cavities for nesting one or more organ or tissue elements. As referred to herein, "nesting" or other similar terms refer to fitting, containing or housing within. The one or more cavities may be lined with materials that simulate the lining of the corresponding real cavity. In some embodiments, the housing further includes a skeletal system. The device may further comprise one or more walls through which a simulated laparascopic procedure can be performed. In a preferred embodiment, the one or more walls correspond to an abdominal wall and are fabricated of a material that allows insufflation. A preferred material for use in forming the housing and/or walls is a silicone material that simulates the corresponding part of the anatomy. In some embodiments, the device is adapted for training and/or evaluation of radiological procedures. In other embodiments, the device is adapted for training and/or evaluation of laparoscopic procedures. In yet other embodiments, the device is adapted for procedures that require particular precision and which may be complicated by the dynamic motion of the organs and body parts involved in the procedure.

In an exemplary embodiment, the training and/or evaluation device comprises a housing in the shape of shape the human torso, one or more organ or tissue elements within the housing, and apparatus for simulating respiration and/or pulmonary action on the organ or tissue element. Preferably, the device is provided so as to simulate the corresponding anatomy in size, dimensions and proportions. The device preferably further comprises one or more cavities corresponding to one or more cavities of the human torso in which the one or more organs or tissue elements are located. The device may include one or more removable wall elements positioned above the one or more organs through which a simulated laparoscopic procedure can proceed. In one embodiment, the one or more wall elements are adapted to correspond to a human abdominal wall and, preferably are adapted to allow for insufflation within the housing. Further, the one or more wall elements are preferably pierceable with laparoscopic instruments. The device may further comprise apparatus to simulate a circulatory system, urinary system and/or digestive system. The housing may further include a skeletal system.

The one or more organs may be fastened to various portions of the device in a manner that simulates the corresponding organ connections in the degrees of freedom by which the organ may move. In some embodiments, the outer housing further houses real or synthetic tissues and muscles that correspond to the tissues and muscles of the live body.

The outer housing is preferably fabricated of one or more materials that simulate the properties of the corresponding portion(s) of the body wall. For example, some suitable materials include, but are not limited to flexible urethane rubbers, thermoplastic polyurethanes and silicone rubbers. Preferably, the materials used in forming the outer housing possess tensile strength, elongation, hardness and/or tear strengths similar to those of the corresponding portion(s) of the body wall. It is particularly desirable to select materials that are "skin-like" in their properties. Preferably, the outer housing is fabricated of a silicone material. If desired, the outer housing may be colored similar to various colors of the human skin.

The device can be used for a variety of training and/or evaluation procedures. In one embodiment, the device is for training and/or evaluation of laproscopic procedures. In such embodiments, the device preferably includes one or more walls positioned above the one or more organs, such that the laparascopic procedure can take place through the one or more walls. Preferably, the one or more walls are fabricated of a material that provides properties similar to those of the corresponding body wall through which the laparascopic procedure is performed. In an exemplary embodiment, the one or more walls corresponds to the abdominal wall and is fabricated of a material that allows insufflation. In some embodiments, the one or more walls contain one or more pre-formed openings through which a laparoscopic procedure may be performed. In some embodiments, the one or more walls are fabricated of a material that is piercable by laparoscopic instruments. In a preferred embodiment, particularly wherein the one or more walls are pierced by laparoscopic instruments, the one or more walls are disposable and removable. The walls may be removably fastened using any conventional fastening means that can be fastened and unfastened repeatedly. For example, fastening means may include, but are not limited to buttons, snaps, hooks, Velcro, clips and mating lips and recessed portions. Some materials useful in forming the one or more walls include, but are not limited to flexible urethane rubbers, thermoplastic polyurethanes and silicone rubbers. Preferably, the materials used in forming the one or more walls possess tensile strength, elongation, hardness and/or tear strengths similar to those of the corresponding body walls (e.g. the abdominal wall). In some embodiments, the one or more walls are fabricated of two or more layers of materials. For example, in an exemplary embodiment, the inner layer is fabricated of a substantially or sanhighly elastic material, such as Cine Skin Silicone A/B with 50% part C (Elongation: 1000% (A/B+50% C), and the outer layer is fabricated of a material selected from those used in forming the outer housing. For example, the one or more walls may comprise two layers, wherein the inner layer is a more elastic material as compared to the outer layer.

In another exemplary embodiment, wherein the device is used for training and/or evaluation of laproscopic procedures, the outer housing includes one or more portions through which a laparoscopic procedure is performed. For example, the one or more portions may include one or more openings through which the one or more organs may be accessed and through which a lapsarascope, laparoscopic instruments, laparascopic tubes and sleeves may be inserted and manipulated. In one embodiment, the device further includes one or more walls positioned between the one or more portions of the outer housing through which a laparoscopic procedure is performed and the one or more organs. During use, a laparascope and laparoscopic instruments are inserted through and manipulated through the one or more walls. The one or more walls contain one or more pre-formed openings through which a laparoscopic procedure may be performed. In some embodiments, the one or more walls are fabricated of a material that is piercable by laparoscopic instruments. In a preferred embodiment, the one or more walls are located so as to removably seal the one or more openings. For example, the wall may be fastened to the outer housing so as to seal the one or more openings. In both embodiments, the walls are preferably fastened using any conventional fastening means. Preferably, the walls are removably fastened and the fastening means are those that can be fastened and unfastened repeatedly. For example, fastening means may include, but are not limited to buttons, snaps, hooks, Velcro, clips and mating lips and recessed portions. In some embodiments, the one or more walls are disposable and removable, and preferably are fabricated of a material that simulates the properties of the corresponding body wall(s) through which the procedure is performed (e.g. flexible urethane rubbers, thermoplastic polyurethanes and silicone rubbers). In some embodiments, the one or more walls are fabricated of a material that allows insufflation.

In another exemplary embodiment, a training and/or evaluation device for use in laparoscopic procedures comprises an outer housing in the shape of a human torso sized and proportioned so as to simulate a human torso, one or more organs within the outer housing provided so as to move with multiple degrees of freedom in a manner that simulates motion of the corresponding organ in a live body, a disposable and removable wall, corresponding to the abdominal wall, positioned above the one or more organs through which the laparoscopic procedure will proceed and means for simulating respiration and/or pulmonary motion. Preferably, the one or more disposable, removable walls are designed to simulate the properties of the abdominal wall. For example, the one or more disposable, removable walls may allow for insufflation in the outer housing and are preferably pierceable with laparoscopic instruments. The device may further comprise one or more cavities for housing the one or more organs. The one or more cavities are preferably positioned, sized and shaped in a manner that simulates the corresponding cavities of a human body. In one embodiment, the means for simulating respiration and/or pulmonary motion comprises one or more tubes through which gases and/or liquids may be circulated. In some embodiments, the device may further comprise a means for simulating the circulatory system, urinary system and/or digestive system. Such means may comprises one or more tubes through which gases and/or liquids may be circulated. If desired, a skeletal system may further be located within the outer housing. Preferably, the skeletal system is a synthetic skeletal system fabricated of a material that provides properties similar to those of a real skeletal system.

In another embodiment, the device is useful for training and/or evaluation of radiological procedures. In such embodiments, the device is preferably designed so as to simulate the size, location and proportions of the corresponding part(s) of the anatomy, and the various organs and tissues contained within the device. Further, the components of the device are preferably fabricated of materials that will allow for realistic simulation of the various radiological procedures. Thus, for example, when the device is used for generating images, the materials forming the various parts will allow for accurate image generation using X-ray, CT (Computed Tomography), MRI (Magnetic Resonance Imaging), Ultrasound, Nuclear Magnetic Resonance Imaging and Interventional Radiology devices.

The present invention also includes methods for training or evaluating a medical procedure comprising using the device described herein and performing a medical procedure. In particular, in one embodiment, methods comprise providing a training device comprising a housing in the shape of at least a portion of a mammalian anatomy, one or more organ or tissue elements within the housing, and apparatus for simulating respiration and/or pulmonary action on the organ or tissue elements, causing respiration and/or pulmonary action to be simulated within the device and performing the medical procedure. During such methods, the one or more organ or tissue elements preferably move as a result of the respiration and or/pulmonary action. The methods may further comprise inserting a laparoscope and one or more laparoscopic instruments into the outer housing and performing a laparoscopic procedure. In another embodiment, the methods further comprise imaging the one or more organ or tissue elements with radiation. In some embodiments, the laparoscopic training and/or evaluation device further comprises apparatus to simulating a circulatory system, urinary system and/or digestive system and the method further comprises, prior to inserting a laparoscope and laparoscopic instruments into the outer housing, causing the circulatory system, urinary system and/or digestive system to be simulated within the laparoscopic training and/or evaluation device. Preferably, the one or more organ or tissue elements move as a result of such simulation in a manner that mimics the motion of the corresponding organ or tissue elements during action by the circulatory system, urinary system and/or digestive system in a live body. As referred to herein, "mimic" or other similar terms refer to simulating, copying or imitating, particularly copying or imitating closely.

One exemplary embodiment provides a method for training and/or evaluating a laparoscopic procedure comprising the steps of: providing a laparoscopic training and/or evaluation device in accordance with any of the embodiments set forth, causing respiration to be simulated within the laparoscopic training and/or evaluation device, wherein the one or more organs move as a result of such respiration in a manner that mimics the motion of the corresponding organ(s) during respiration in a live body, and inserting a laparoscope and laparoscopic instruments into the outer housing and performing a laparoscopic procedure. Preferably, the laparoscopic training and/or evaluation device further comprises one or more cavities in which the one or more organs are located in a manner that simulates the organ and cavity placement in a live body. One or more walls are preferably included above the one or more organs through which the laparoscopic procedure is performed and thus, the laparoscope and laparoscopic instruments are inserted into the outer housing through the wall(s). In one embodiment, the wall includes one or more pre-formed openings, and thus, the laparoscope and laparoscopic instruments are inserted into the outer housing through the wall by inserting them through one or more of the pre-formed opening(s). In another embodiment, the laparoscope and laparoscopic instruments are inserted into the outer housing by piercing the wall and inserting the laparoscope and laparoscopic instruments through the openings formed in the wall. In some procedures, prior to inserting the laparoscope and laparoscopic instruments into the outer housing, gas is injected into the outer housing to insufflate the interior of the outer housing. In an exemplary embodiment, one or more tubes through which liquids and/or gases may be circulated provide a mechanism for simulating respiration and the methods further involve causing respiration to be simulated by flowing one or more liquids and/or gases through the tube(s). If desired, the laparoscopic training and/or evaluation device may further comprise a means for simulating pulmonary motion, the circulatory system, urinary system and/or digestive system and the method further comprises, prior to inserting a laparoscope and laparoscopic instruments into the outer housing, causing pulmonary motion, the circulatory system, urinary system and/or digestive system to be simulated within the laparoscopic training and/or evaluation device, wherein the one or more organs move as a result of such motion and/or simulation in a manner that mimics the motion of the corresponding organ(s) during action by the pulmonary motion, circulatory system, urinary system and/or digestive system in a live body. In some embodiments, the outer housing or wall(s) also move as a result of the motion and/or simulation in a manner that mimics the motion of the corresponding body wall portion(s) during such respiration, pulmonary motion or action by the circulatory system, urinary system and/or digestive system. In some embodiments, the outer housing further houses a skeletal system and the method further comprises the step of inserting a laparoscope and laparoscopic instruments into the outer housing through the skeletal system.

In another embodiment, the present invention provides methods for training and/or evaluating a radiological procedure by providing a training and/or evaluation device in accordance with any of the embodiments set forth herein, particularly a device comprising an outer housing in the shape of one or more portions of a mammalian anatomy, one or more organ or tissue elements within the outer housing provided so as to move with multiple degrees of freedom, and means for simulating respiration. The method further comprises causing respiration to be simulated within the training and/or evaluation device, wherein the one or more organ or tissue elements move as a result of such respiration in a manner that mimics the motion of the corresponding organ(s) and tissue element(s) during respiration in a live body and performing a radiological procedure. Such methods may further include causing pulmonary motion, the circulatory system, urinary system and/or digestive system to be simulated within the training and/or evaluation device, wherein the one or more organs move as a result of such motion and/or simulation in a manner that mimics the motion of the corresponding organ(s) during action by the pulmonary motion, circulatory system, urinary system and/or digestive system in a live body.

As discussed herein, a wide variety of actual or simulated organs or tissue may be manipulated and/or treated in accordance with the invention, including e.g. actual or simulated heart, lung, liver, kidney, prostrate, testes, ovaries, skeletal muscle, epithelial tissue, connective tissue, nerve tissue, breast tissue, kidneys, brain, spleen, stomach, intestines, and the like. As referred to herein, an "organ or tissue element" or other similar term includes such actual tissue or organ (as may obtained from an animal, particularly a mammal such as a cow, sheep, primate or the like) or simulated tissue or organ (which may be commercially available or constructed from materials as disclosed herein such as a silicone to approximately replicate e.g. such mammalian (particularly human) organ or tissue), including actual or simulated heart, lung, liver, kidney, prostrate, testes, ovaries, skeletal muscle, epithelial tissue, connective tissue, nerve tissue, breast tissue, kidneys, brain, spleen, stomach, intestines, and the like.

The present invention further includes kits for training and/or evaluating laparoscopic and/or radiological procedures comprising one or more of the devices described herein. The one or more devices are preferably packaged in sterile condition.

Other aspects, embodiments and advantages of the present invention will become readily apparent to those skilled in the art are discussed below. As will be realized, the present invention is capable of other and different embodiments without departing from the present invention. Thus the following description as well as any drawings appended hereto shall be regarded as being illustrative in nature and not restrictive.

BRIEF DESCRIPTION OF THE DRAWING

For a fuller understanding of the nature and desired objects of the present invention, reference is made to the following detailed description taken in conjunction with the accompanying drawing figures wherein like reference character denote corresponding parts throughout the several views and wherein:

FIG. 2a shows a digitally manufactured woodblock that can be used in forming the torso. FIG. 2b shows one embodiment of a synthetic torso with an abdominal cavity and replaceable abdominal wall.

FIG. 4a shows the wall as fastened on the outer housing and being pierced with a laparoscopic instrument. FIG. 4b shows the wall as a two-layer structure.

FIG. 5a-b shows an embodiment of a synthetic torso with a replaceable wall removed (a) and attached (b) to the outer housing.

DETAILED DESCRIPTION OF THE INVENTION

Figure 1:
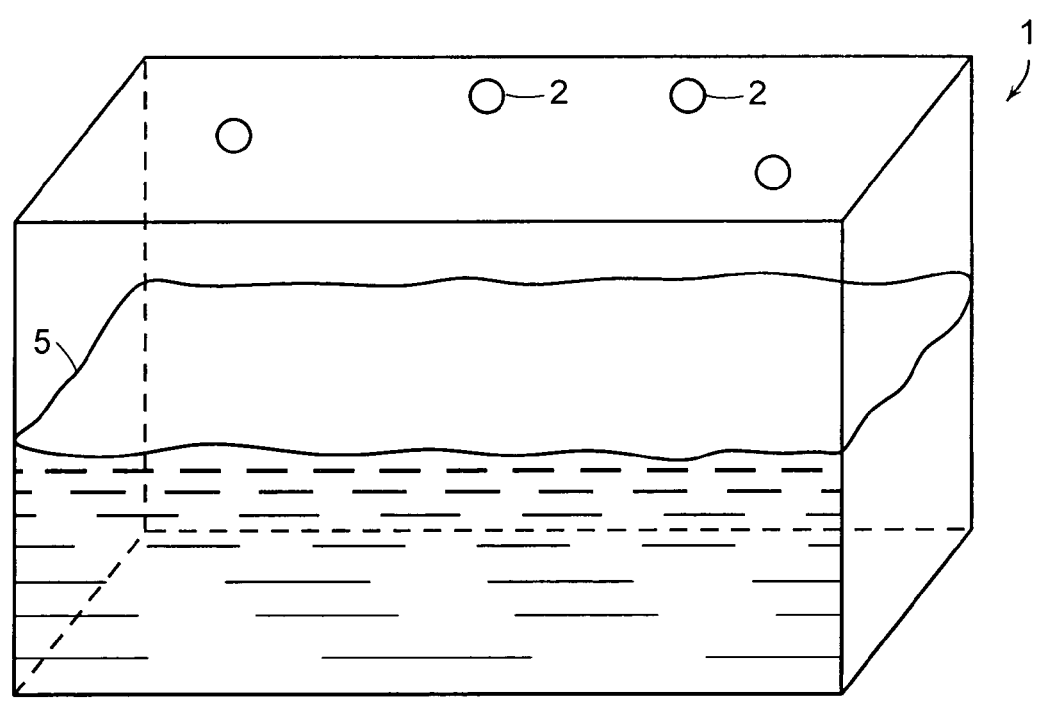
FIG. 1 shows one embodiment of the present device in the form of a box-like outer housing having a wall through which a procedure may occur.

The present invention provides devices and methods for use in training individuals in medical procedures. In particular, the devices and method are useful in performing laparoscopic surgeries, radioscopic procedures, and precise procedures that may be impacted by the dynamic motion of a live body.

Preferred devices of the invention include a housing; an organ and/or tissue element; and apparatus that can simulate one or more forces by a live subject (such as a mammal, particularly a human, who may be male, female, child or adult) on the organ and/or tissue element. The one or more forces exerted on the organ and/or tissue element suitably are those forces that result from what is generally considered to be involuntary motion by a live mammal, such as motion that results from respiration, pulmonary system (particularly heartbeat), circulatory system, digestive system, and the like, particularly respiration and/or pulmonary action.

Referring now to the drawings, which depict illustrative embodiments of the invention, preferred devices comprise an outer housing 1 that represents the body wall of the human anatomy. The body wall forms the framework that supports the body and encloses the cavities and organ and tissue elements of the body. The outer housing 1 further includes means for housing one or more organ or tissue elements. It is preferred that the outer housing may 1 be opened and sealed repeatedly so as to add and remove organ or tissue elements as desired for each procedure. In some embodiments, wherein the device is used for performing laparoscopic procedures, the portion of the outer housing through which the laparoscope and various laparoscopy instruments are inserted and manipulated may be made with pre-formed openings 2 through which the laparoscope and instruments are inserted and manipulated either directly through the openings 2 or through tubes and/or sleeves inserted through the openings 2. In other embodiments, the portion of the outer housing through which the laparoscope and various laparoscopy instruments are to be inserted and manipulated may be fabricated of a disposable wall 3 that mimics the properties of that portion of the body wall so that a user may make incisions and form openings through which the laparoscope, instruments, sleeves and tubes may be inserted.

In one embodiment, as shown in FIG. 1, the outer housing 1 is in any simple geometric shape, e.g. square, rectangular, oval, etc. and includes one or more cavities 4 for housing one or more organ or tissue elements.

In another embodiment, the outer housing 1 is specifically designed so as to replicate the shape of a mammalian anatomical structure, preferably a human anatomical structure. Thus, for example, it would be desirable to provide an outer housing having a shape that would be recognizable to a viewer as the shape of the human body or portion(s) of the human body. For example, as shown in FIGS. 2-6, the outer housing 1 may be in the shape of a human torso and may contain one or more cavities 4 for housing one or more organ or tissue elements.

The outer housing 1 may contain a plurality of pre-formed openings 2 through which a laparoscope and instruments can be inserted and manipulated either directly or through tubes and/or sleeves inserted through the openings 2. The outer housing 1 may further contain a wall or sheet of material 5 that mimics the body wall, for example the abdominal wall, between the pre-formed openings 2 and the one or more organ or tissue elements within the outer housing 1. The wall or sheet of material 5 is preferably formed so as to allow for insufflation, which is often performed on abdominal cavities during laparoscopic procedures. In some embodiments, the wall or sheet of material 5 contains one or more pre-formed openings through which a procedure takes place. In another embodiment, the wall or sheet of material is punctured using the laparoscopic instruments and, thus, is preferably replaceable and disposable. The outer housing 1, having pre-formed openings may for fabricated of any materials. For example, in some embodiments, the outer housing 1 is fabricated of metals or plastics. In these embodiments, the body wall characteristics are simulated via the wall or sheet of material 5 within the outer housing 1.

In other embodiments, the outer housing 1 does not contain a wall or sheet of material 5 but, rather, the outer housing 1 itself is fabricated of a material selected to have the appearance, texture, tensile properties, elastomeric properties, density and/or various other properties of the body wall. At the very least, in this embodiment, the portion of the outer housing through which the procedure takes place is fabricated of a material selected to mimic the various desired properties of that portion of the body wall. In particular, it is desirable to design the portion of the outer wall 1 through which the procedure takes place of materials that will provide the surgeon with proper tactile feedback when the outer wall 1 is touched, cut, sutured or otherwise manipulated with the various instruments used during a laparoscopic procedure. Still further, the elastic properties of the materials preferably allows for respiratory motion simulation and insufflation. Some useful materials include, but are not limited to, flexible urethane rubbers, thermoplastic polyurethanes and silicone rubbers. Some important properties that are considered in selecting suitable materials include tensile strength, elongation, hardness and tear strength. It is particularly desirable to select materials that are "skin-like" in their properties. In particularly preferred embodiments, a number of "skin-like" materials can further be selected based on the ease of the molding process using such materials, the resulting mechanical properties, the ability to vary these properties by changing the mixing ratios of the components, the color of the materials, and the availability to use die pigments for various color settings. For example, in some embodiments, it can be desirable to provide an outer wall 1 that is realistic in appearance and, thus, in some embodiments, the materials used in forming the outer wall 1 can preferably be modified to provide a skin-like appearance by the use of colors and dye pigments if necessary. One particularly preferred commercially available material for use in forming the outer wall 1, or portions of the outer wall 1, is Cine Skin Silicone A/B from Burman Industries Inc (Van Nuys, Calif.). Cine Skin Silicone A/B is a room temperature vulcanizing rubber having the following physical properties: hardness, shore: A 10; specific gravity: 1.14; tensile strength: 525 psi (A&B only); elongation: 575% (A&B only); elongation: 1000% (A/B+50% C); color: Translucent clear; viscosity: 50000 cps at 77° F. Other materials having similare physical properties would also be suitable. Other "skin-like" materials include: Ecoflex©Rubbers and Dragon Skin™ from Smooth-on (Easton, Pa.) (http://www.smooth-on.com/liqrubr.htm); liquid silicone rubber from Stockwell Rubber Company (Philadelphia, Pa.) (http://www.stockwell.com/); Duralco 4538D from Contronics Corporation (Brooklyn, N.Y.)

In some preferred embodiments, wherein the outer housing 1 is fabricated at least in part of materials that mimic the corresponding portion of the body wall, a plurality of pre-formed openings 2 may be included. In other embodiments, no openings 2 are present and the user makes incisions in the portion of the outer housing 1 through which the procedure takes place. In such embodiments, the portion of the outer housing 1 through which the procedure takes place is preferably disposable and replaceable. Thus, for example, the outer housing 1 may have an opening that is removably sealed with a disposable wall (e.g. a disposable "abdominal" wall) 3 that can be replaced after repeated puncture with laparoscopic instruments. This disposable wall 3 can be fastened to the outer housing 1 using any conventional fastening means that can be fastened and unfastened repeatedly. For example, some exemplary fasteners include, but are not limited to Velcro, buttons, snaps, mating recesses/depressions and lips, and hooks. Some commercially available fasteners that are particularly suitable include Flextite from Minigrip/ZIPPAK (Orangeburg, N.Y.) (http://www.minigrip-zippak.com/pvc-_zipper.html); and the reclosable fastener system (Hook and loop) from 3M Corporation (St. Paul, Minn.) http://www.3m.com/us/healthcare/personal_care/fastening/reclosable.jhtml). Such fasteners should also allow for the making of incisions in the disposable wall if required, the placement and manipulation of instruments through such incisions and abdominal wall insufflation without becoming unfastened by such manipulations.

Figure 7:
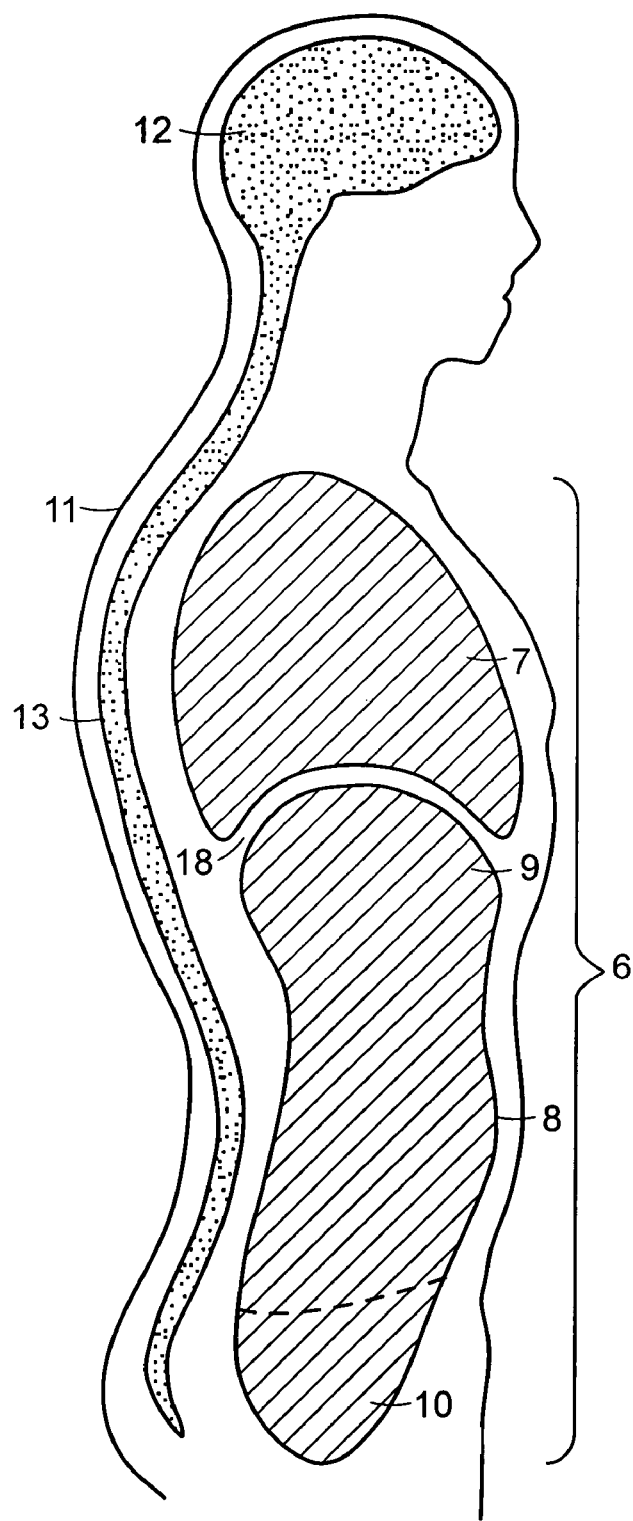
FIG. 7 shows a drawing of the upper human body with the various body cavities.

There are many body cavities, particularly in the torso and head, which are shown in FIG. 7. The most prominent cavity is the ventral cavity 6 within the torso and the dorsal cavity 11 within the body wall. The ventral cavity 6 is enclosed by the rib cage and the abdominal musculature and includes the thoracic cavity 7 and abdominopelvic cavity 8. The thoracic cavity 7, which is enclosed by the rib cage and separated from the abdominopelvic cavity 8 by the diaphragm, in turn includes the pericardial cavity which surrounds heart and is formed by pericardial membrane, and the pleural cavity which surrounds the lungs and is formed by pleural membrane. The abdominopelvic cavity 8 is below the diaphragm, and includes the abdominal cavity 9 and the pelvic cavity 10. Cavities in the upper torso and head include the dorsal cavity 11, which is enclosed completely by bones of the skull and vertebral column. Three membranes surround the internal structures of the dorsal cavity 11, the dura, arachnoid, and pia mater. The dorsal cavity 11 is further split into the cranial cavity 12 which is the cavity within the skin housing the brain, and the spinal cavity 13 which is the cavity formed by the vertebrae enclosing the spinal cord.

The outer housing 1 may be designed so as to contain any one or more of these cavities discussed above.

Further, the human anatomy includes a number of organ systems, or groups of organs that work together in a related function. Such organ systems are well known to one of skill in the art and may be included in the present device. In particular, the organ systems of the human anatomy include the integumentary system, skeletal system, muscular system, nervous system, endocrine system, digestive system, cardiovascular and lymphatic systems, respiratory system, urinary system and reproductive system. The integumentary system forms the outermost part of the body wall (the skin), and includes the epidermis and dermis. Accessory structures: include the hair, nails, glands and sensory endings. The skeletal system includes the bones, joints and ligaments. The muscular system includes the skeletal muscles and tendons. The nervous system includes the central nervous system (brain and spinal cord), the PNS and the sensory structures. The endocrine system includes the endocrine tissues. The digestive system includes the alimentary canal (mouth, esophagus, stomach, intestines, colon, rectum/anus) and accessory structures include the salivary glands, pancreas, liver and gall bladder. The cardiovascular and lymphatic systems include the heart, blood vessels (arteries, capillaries, veins), blood lymph nodes, vessels and lymph reticuloendothelial system (spleen, bone marrow, lymph nodes). The respiratory system includes the nose, airways (pharynx, larynx, bronchi, etc) and lungs. The urinary system includes the kidneys, ureters, bladder and urethra. The male reproductive system includes the gonads (testis), epididymis tube, vas deferens tube, urethra tube, prostate, seminal vesicles and bulbourethral glands. The female reproductive system includes the gonads (ovaries), uterine tubes, uterus, vagina and vestibular glands.

The outer housing 1, may be designed so as to contain any one or more of the various organs and/or organ systems of a mammalian anatomy, particularly a human anatomy. Such organs and/or organ systems may include any of those discussed above or known to one of skill in the art. Thus, for example, the outer housing 1 may contain one or more of the following organs: bones, cartilage, tendons, ligaments, skeletal muscles, smooth muscles, heart, blood vessels, blood, brain, spinal cord, peripheral nerves, nose, trachea, lungs, mouth, esophagus, stomach, small and large intestines, kidneys, ureters, bladder, urethra, glands such as the hypothalamus, pituitary, thyroid, pancreas and adrenal glands, ovaries, oviducts, uterus, vagina, mammary glands, testes, seminal vesicles, penis, lymph, lymph nodes and vessels, white blood cells, T- and B-cells.

Further the present device may be designed so as to contain any one or more of the various tissues of a mammal. Such tissues are well known to one of skill in the art and may be included in the present device. In particular, it is known that cells group together in the body to form tissues, which are a collection of similar cells that group together to perform a specialized function. There are four primary tissue types in the human body: epithelial tissue, connective tissue, muscle tissue and nerve tissue. The cells of epithelial tissue pack tightly together and form continuous sheets that serve as linings in different parts of the body. Epithelial tissue can serve as membranes lining organs and helping to keep the body's organs separate, in place and protected. Some examples of epithelial tissue are the outer layer of the skin, the inside of the mouth and stomach, and the tissue surrounding the body's organs. There are many types of connective tissue in the body. Generally, connective tissue adds support and structure to the body. Most types of connective tissue contain fibrous strands of the protein collagen that add strength to connective tissue. Some examples of connective tissue include the inner layers of skin, tendons, ligaments, cartilage, bone and fat tissue. Blood is also considered a form of connective tissue. Muscle tissue is a specialized tissue that can contract. Muscle tissue contains the specialized proteins actin and myosin that allow movement. Examples of muscle tissue are contained in the muscles throughout the body. Nerve tissue contains two types of cells: neurons and glial cells. Nerve tissue has the ability to generate and conduct electrical signals in the body. These electrical messages are managed by nerve tissue in the brain and transmitted down the spinal cord to the body.

Methods of the present invention include the use of the device to perform various procedures on one or more of the known organs, organ systems and/or tissues of a mammal, such as those organs, organ systems and/or tissues listed herein with relation to the human anatomy.

In some embodiments, the outer housing 1 is designed to contain only those cavities, tissues and/or organs that are involved with the particular surgical procedure being practiced. For example, in performing a surgery on the upper urinary tract, the synthetic torso may be designed so as to provide only the pelvic cavity and the pelvic cavity may house only the organs of the upper urinary tract. However, it may be desirable to provide a device that can be used for multiple procedures. Thus, it may be desirable in some embodiments to provide an outer housing 1 that contains all/most cavities of the corresponding portion of the human anatomy. Further, it may be desirable to provide not only those organs that are being operated on, but also surrounding organs that may somehow impact how the procedure is performed. Still further, it may be desirable in some embodiments to provide all cavities with all organs, regardless of whether or not they may somehow impact how the procedure is performed.

The cavities and one or more organ or tissue elements within the outer housing 1 may be sealed by the use of one or more disposable walls 3, which simulates the corresponding portions of the body wall (e.g. the abdominal wall). The user can then make incisions through the one or more disposable walls 3 and perform the procedure through these incisions. The one or more disposable walls 3 can be replaced after repeated punctures with laparoscopic instruments. This disposable wall 3 can be fastened to the outer housing 1 using any conventional fastening means that can be fastened and unfastened repeatedly. For example, some exemplary fasteners include, but are not limited to Velcro, buttons, snaps, mating recesses and lips and hooks. In alternate embodiments, a plurality of pre-formed openings 2 may be included in that portion of the outer housing 1 through which a procedure will take place.

In particularly preferred embodiments, the device includes means for providing simulated respiration that mimics the respiratory system through a live body. For example one or more tubes 14 (as depicted in FIG. 5a exiting the outer housing 1 via the neck of a torso-shaped outer housing) may be located in the device in a manner that simulates the pathways through which respiration occurs in the human body. A pump or other type of device (not shown) that circulates air, other gases or liquids in a manner that simulates respiration is in connection with these tubes 14. Thus, the means for simulating respiration will provide a device that is in motion and organ and tissue elements that are in motion like a live body. For example, a Large Animal Volume Controlled Ventilator from Harvard Apparatus (Holliston, Mass.) (www.harvard-apparatus.com), or similar type of apparatus may be used. The Large Animal Volume Controlled Ventilator has a volume that is adjustable from 30-70 cc/stroke; a rate that is adjustable from 7-50 strokes/min; and a phase that is adjustable from 25 to 50% of single stroke cycle continuously variable while the pump is in operation.

The outer housing 1 may further include a mechanism for simulating the pulmonary system, digestive system, cardiovascular and lymphatic systems, and/or urinary systems, if desired. Thus, for example, further tubes 14 may be located in the outer housing 1 through which gases or liquids are pumped in a manner that simulates the urinary system. Still further, an animal or synthetic heart may be located in the outer housing 1 and can be provided with a means by which the heart is made to beat like the heart of a live human, thereby adding further dynamic motion that simulates that of a live body. For example, in one embodiment, the heart is in connection with tubes 14 through which fluids or gasses can be made to flow so as to provide a beating heart. Any fluids or gases may be used, and such fluids and gases preferably have properties that are similar to that of human blood and urine.

Figure 3:
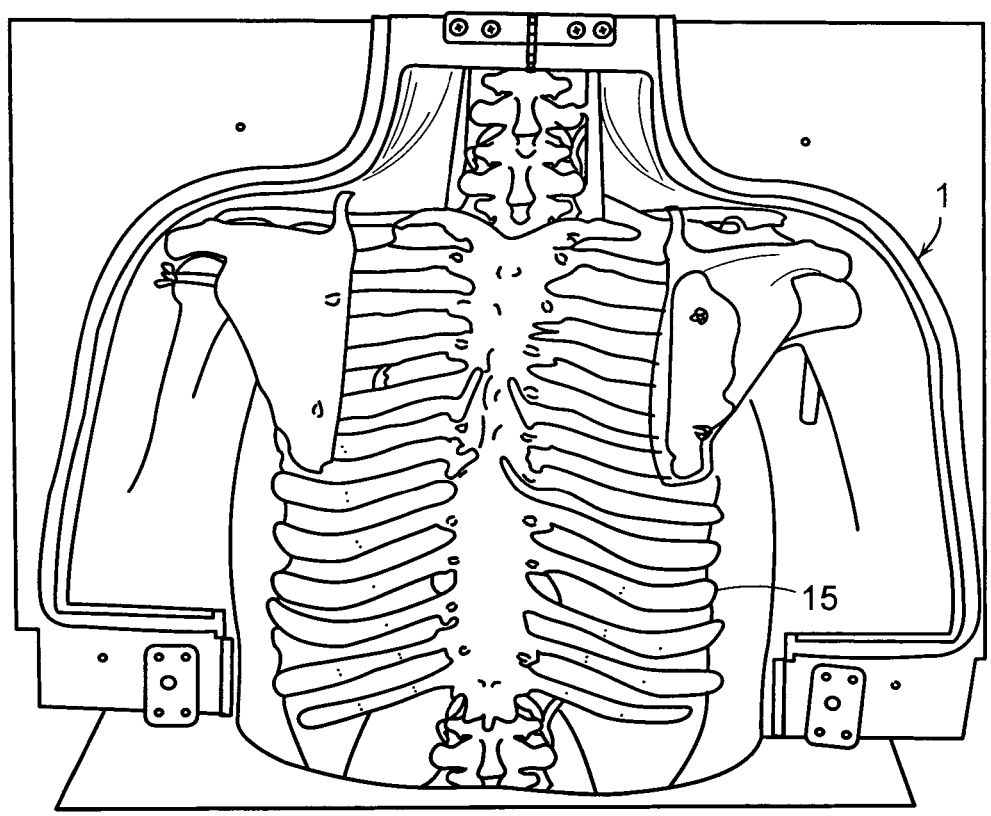
FIG. 3 shows one embodiment wherein a synthetic skeleton is placed within the device.
Figure 4A:
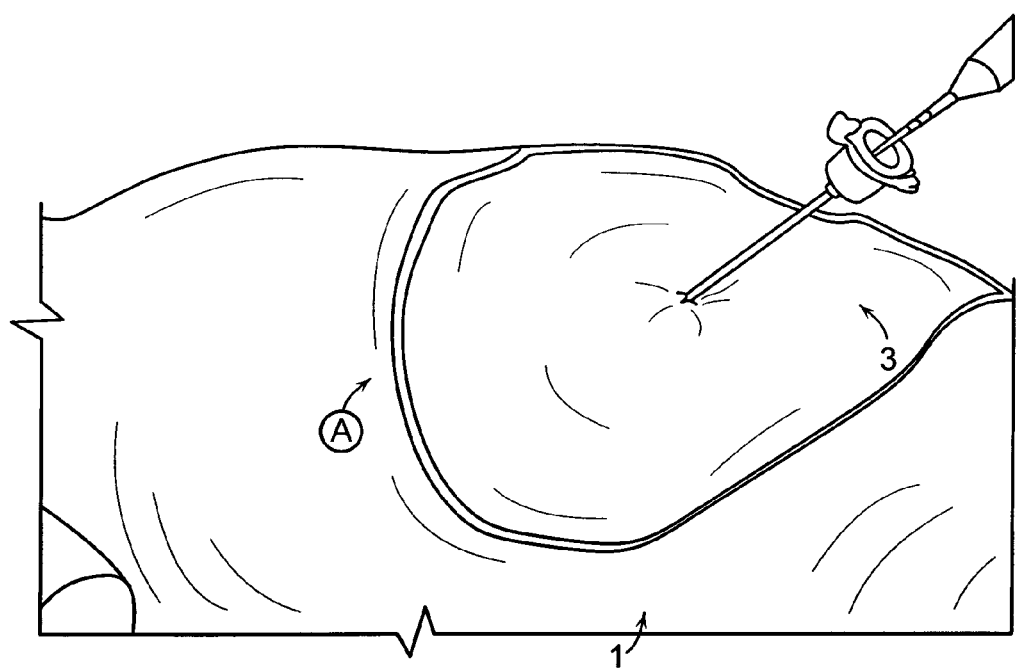
FIG. 4a-b shows an embodiment of a replaceable abdominal wall.
Figure 4B:
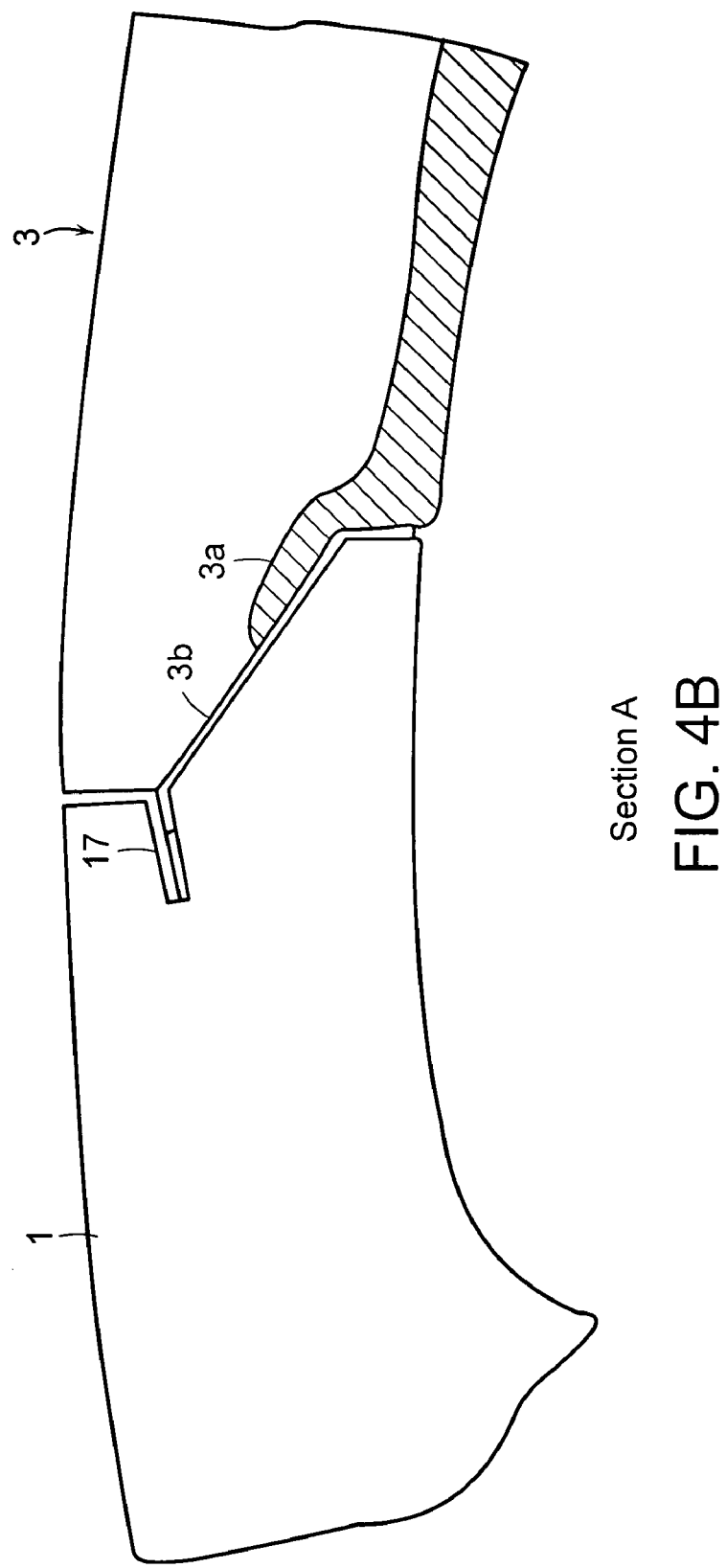

In some embodiments, the outer housing 1 further includes a skeletal system, either real or synthetic, for example, as shown in FIG. 3. The skeletal system will provide an accurate environment in which the laparascope and various instruments must be inserted and manipulated. The skeletal system is preferably fabricated of synthetic materials. Synthetic skeletal systems are known and, thus, the design of the skeletal systems for use with the synthetic torso can be in accordance with these conventional skeletal systems. Such skeletal systems are designed so as to provide the texture, elastomeric properties, density and various other properties of the human skeletal system 15. Materials useful in forming a synthetic skeletal system 15 include, but are not limited to plastics, preferably durable, unbreakable plastics, such as those available through 3B Scientific (Rudorffweg 6, 21031, Hamburg) (www.3bscientific.com). If a pre-formed skeleton is used, the outer housing 1 may be scaled to fit the size of the skeleton. Alternatively, pre-formed skeletons scaled to the size of the outer housing 1 can be used.

The outer housing 1, along with the disposable abdominal wall, cavity walls, skeletal system, synthetic organs and various tissues are fabricated of materials selected to provide accurate simulation of the corresponding anatomical structures. For example, the materials may be selected to provide similar appearance, texture, tensile properties, elastomeric properties, density and/or various other properties of the corresponding real anatomical structures. In particular, it is desirable to design the outer housing, disposable abdominal wall, cavity walls, skeletal system, organ and tissue elements and any other incorporated elements so as to provide the surgeon with proper tactile feedback when these objects are touched, cut, sutured or otherwise manipulated with the various instruments used during a laparoscopic procedure. Further, in some embodiments, it is desirable to design the outer housing, disposable abdominal wall, cavity walls, skeletal system, organ and tissue elements and any other incorporated elements so as to provide a device that will provide an image, using various radiological procedures, similar to those provided using a live body. Thus, the outer housing, disposable abdominal wall, cavity walls, skeletal system, organs and other portions can be fabricated of any material that mimics the properties of the corresponding real anatomical structure. Further, in some embodiments the various parts of the device are preferably formed by molding processes. Thus, in some embodiments the materials are preferably easily moldable. Still further, the elastic properties of the materials preferably allows for respiratory motion simulation, pulmonary motion simulation, motion from the circulation of various fluids through the device, beating of a heart if included, and insufflation if performed. In particular some useful materials include, but are not limited to, flexible urethane rubbers, thermoplastic polyurethanes and silicone rubbers. Some important properties that are considered in selecting suitable materials include tensile strength, elongation, hardness and tear strength. It is particularly desirable to select materials that are "skin-like" in their properties. In particularly preferred embodiments, a number of "skin-like" materials can further be selected based on the ease of the molding process using such materials, the resulting mechanical properties, the ability to vary these properties by changing the mixing ratios of the components, the color of the materials, and the availability to use die pigments for various color settings. In some embodiments, for example, it can be desirable to provide an outer housing 1, organ and tissue elements and other elements that are realistic in color and, thus, in some embodiments, the materials can be modified to provide a realistic appearance by the use of colors and dye pigments if necessary. One particularly preferred commercially available material is Cine Skin Silicone A/B, discussed herein and other materials having similar properties. Other commercially available materials include Ecoflex©Rubbers, Dragon Skin™, liquid silicone rubber and Duralco 4538D.

It is particularly beneficial to provide motion of the one or more organ or tissue elements within the outer housing 1 so as to closely simulate the atmosphere, physically and dynamically, within the human body. In particular, when performing a laparoscopic procedure on a live human, the organs and body walls of the subject are in constant motion due, in part, to respiration, pulmonary action, circulation of fluids and the beating of the heart. It is particularly beneficial to provide an accurate training device on which laparoscopic procedures can be performed, wherein the body walls, organ and tissue elements and other portions of the device simulate live motion, which has multiple degrees of freedom. This provides an accurate environment because the body walls, organs and tissue elements are not static nor do they move in limited degrees of freedom in a live human body. Thus, the device is provided with a means for simulating the respiration of air and/or the circulation of fluids through the outer housing 1 much like the flow of air, blood, urine and other materials through the human body. Still further the a means for simulating pulmonary motion and the beating of the heart, which provides further motion, are preferably incorporated into the device as discussed above.

In one preferred embodiment, the outer housing 1 is specifically designed so as to replicate the shape of the a mammalian anatomical structure. Thus, for example, the outer housing 1 may be recognized by a viewer as the shape of a human anatomical structure, e.g. the human torso or head. For example, as shown in FIGS. 2-6, the outer housing 1 may be in the shape of a human torso. The synthetic torso is preferably designed so as to present a replica of the human anatomy, in physical, dynamic and mechanical properties. Thus, for example, the shape, proportions and structure of the synthetic torso are preferably designed to replicate the human anatomy. For example, the average dimensions of a male torso, based on a typical 6 foot tall male, are: a height of approximately 820 mm (32 inches), a width of approximately 510 mm (20 inches), a depth of approximately 250 mm (10 inches) and an external neck diameter of approximately 140 mm (5.5. inches). Thus, for example, when providing a synthetic torso of an average adult male, wherein the dimensions are intended to replicate those of an average adult male, the dimensions may be as follows: height ranging from about 24 to about 33 inches, width ranging from about 15 to about 21 inches, depth ranging from about 7 to about 11 inches, and an external neck diameter ranging from about 4 to about 6 inches. If the outer housing 1 is provided in the shape, dimensions and proportions of an average female, the dimensions for the average adult female would be approximately 10-12% smaller than those of the average adult male. Thus, the dimensions for an outer housing 1 provided in the shape and dimensions of an average adult female may be, for example: height ranging from about 21 to about 30 inches, width ranging from about 13 to about 19 inches, depth ranging from about 6 to about 10 inches, and an external neck diameter ranging from about 3.5 to about 5.5 inches. If the outer housing 1 is provided in the shape, dimensions and proportions of an average youth, the dimensions for the average adult youth would be approximately 15-20% smaller than those of the average adult male. Thus, the dimensions for an outer housing 1 provided in the shape and dimensions of an average youth may be, for example: height ranging from about 19 to about 28 inches, width ranging from about 12 to about 18 inches, depth ranging from about 5.5 to about 9.5 inches, and an external neck diameter ranging from about 3.2 to about 5.1 inches. Further, these dimensions may be used in forming a device having an outer housing 1 of any geometrical shape (e.g. box-simulator) such that the overall dimensions are in proportion to those of a live male, female or youth.

The synthetic torso includes means by which one or more synthetic and/or animal organ or tissue elements may be incorporated. In a preferred embodiment, the outer housing includes one or more body cavities 4, like those contained in the human anatomy, for housing one or more organ or tissue elements. In one preferred embodiment, the synthetic torso that includes cavities corresponding to the thoracic cavity 7 and abdominopelvic cavities 8. The abdominopelvic cavity 8 may further be split into the abdominal cavity 9 and the pelvic cavity 10. One or more of the organ or tissue elements of the human anatomy located in these cavities are then located within these cavities 4.

The one or more organ or tissue elements are preferably housed within the cavities 4 in a manner that simulates the environment of the human body. In particular, one or more organ or tissue elements are preferably placed in the cavities 4 and are held in proper position and allowed to move in accordance with organ and tissue elements within a live human body. When required, conventional fastening means that will withstand manipulation of the organ and tissue elements during a laparoscopic procedure may be used for portions of organ and tissue elements that are somehow interconnected to other portions of the anatomy. For example, the kidney may be held in place in a manner that simulates a live body by the use of, for example, water balloons placed in proximity to the kidney, particularly on top of the kidney. Water balloons can be easily sized and situated with relation to various organ and tissue elements so as to simulate the environment within a live body. Further, real organs can be used in some applications and can be obtained in a form that includes the surrounding tissues and fat. Thus, for example, one may wish to use the device of the present invention to learn and practice a procedure in which the kidney is detached. For such a procedure, one may, for example, obtain a real kidney with the tissues and fat that surround the kidney. The kidney can then be propped into proper position using any type of fastening means, such as tape, and by further placing one or more water balloons on top of the kidney.

In some embodiments, the one or more organ or tissue elements are in contact with materials that line the cavities 4, in the manner that muscle tissue lines the cavities in the human anatomy. Further, much like the abdominal and thoracic cavities are separated by the diaphragm, a wall of material may be located between the abdominal and thoracic cavities to simulate the diaphragm. Thus, the cavities 4 are preferably lined and separated with materials that mimic those lining human cavities such that, for example, if an organ or tissue element moves as a result of respiration or as a result of manipulation by a laparoscopic instrument and the organ or tissue element contacts the cavity wall or the diaphragm wall, the organ or tissue element will react as it would in a live body.

Further, the one or more organ or tissue elements in the cavities 4 may be interconnected and connected to the cavities 4 in a manner that simulates the human anatomy by the use of tissue-like materials similar to those found in the corresponding anatomical structure. In particular, fastening means that provide the same type of motion as the corresponding anatomic connection means may be used. For example, if an organ is connected in a manner that allows any type of motion, not limited in its degree of freedom, then it could be connected in the present device using, for example, a string-like material with sufficient slack to allow for unlimited motion. Where motion is limited to particular degrees, hinge-like fastening mechanisms and the like could be used to simulate such limits on the motion.

Figure 2A:
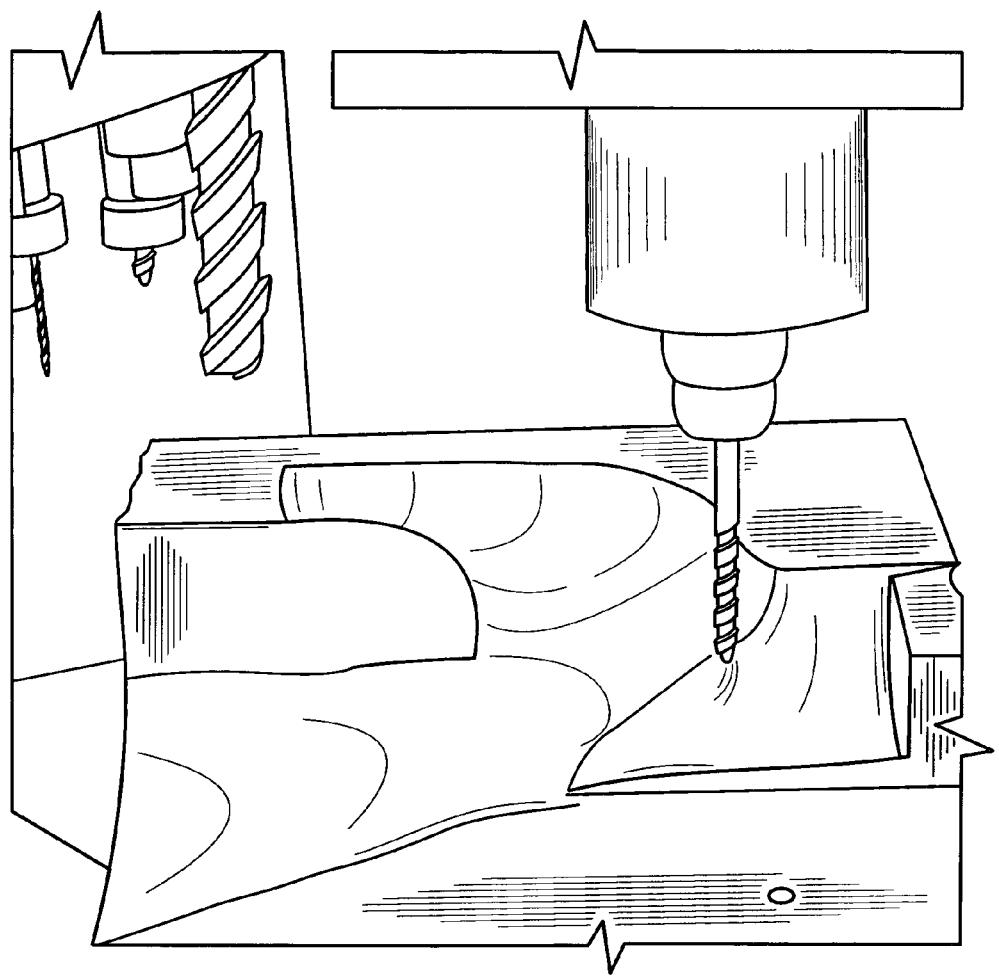
FIG. 2a-b shows one embodiment of the present device in the form of a synthetic torso.
Figure 2B:
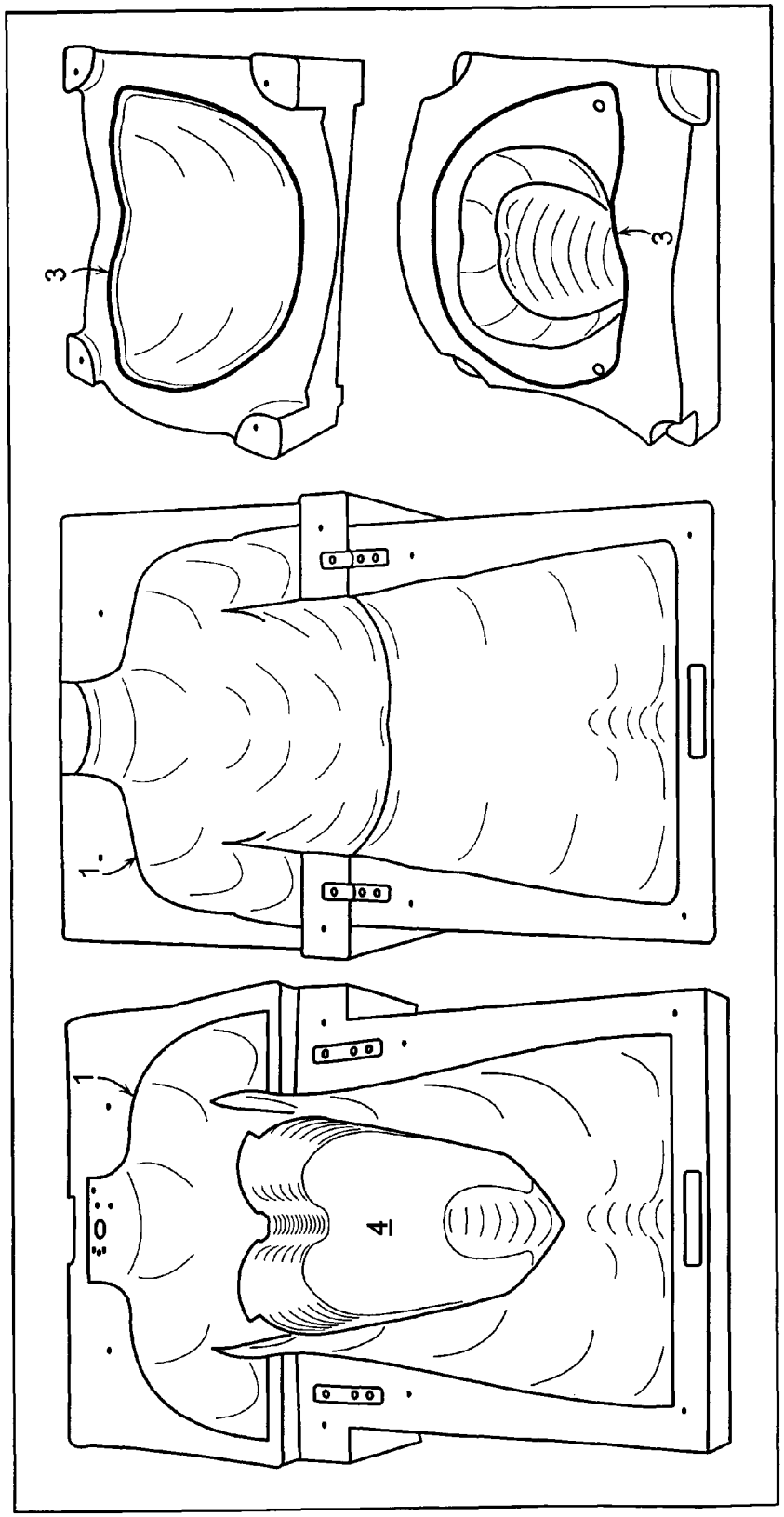
Figure 8A:
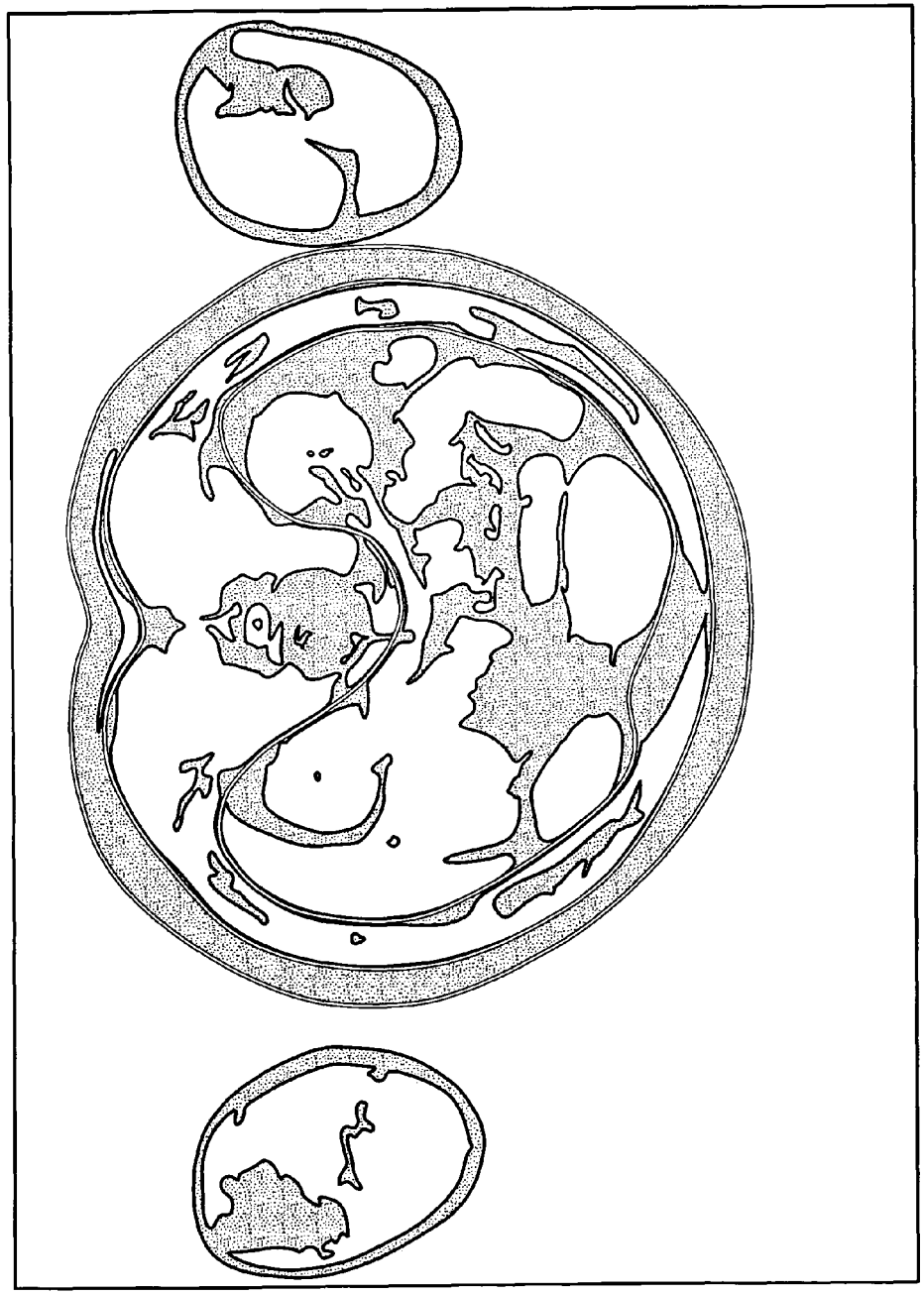
FIG. 8a-b shows an embodiment wherein a synthetic torso was based on a 3D model of a typical male, which was segmented and reconstructed.
Figure 8B:
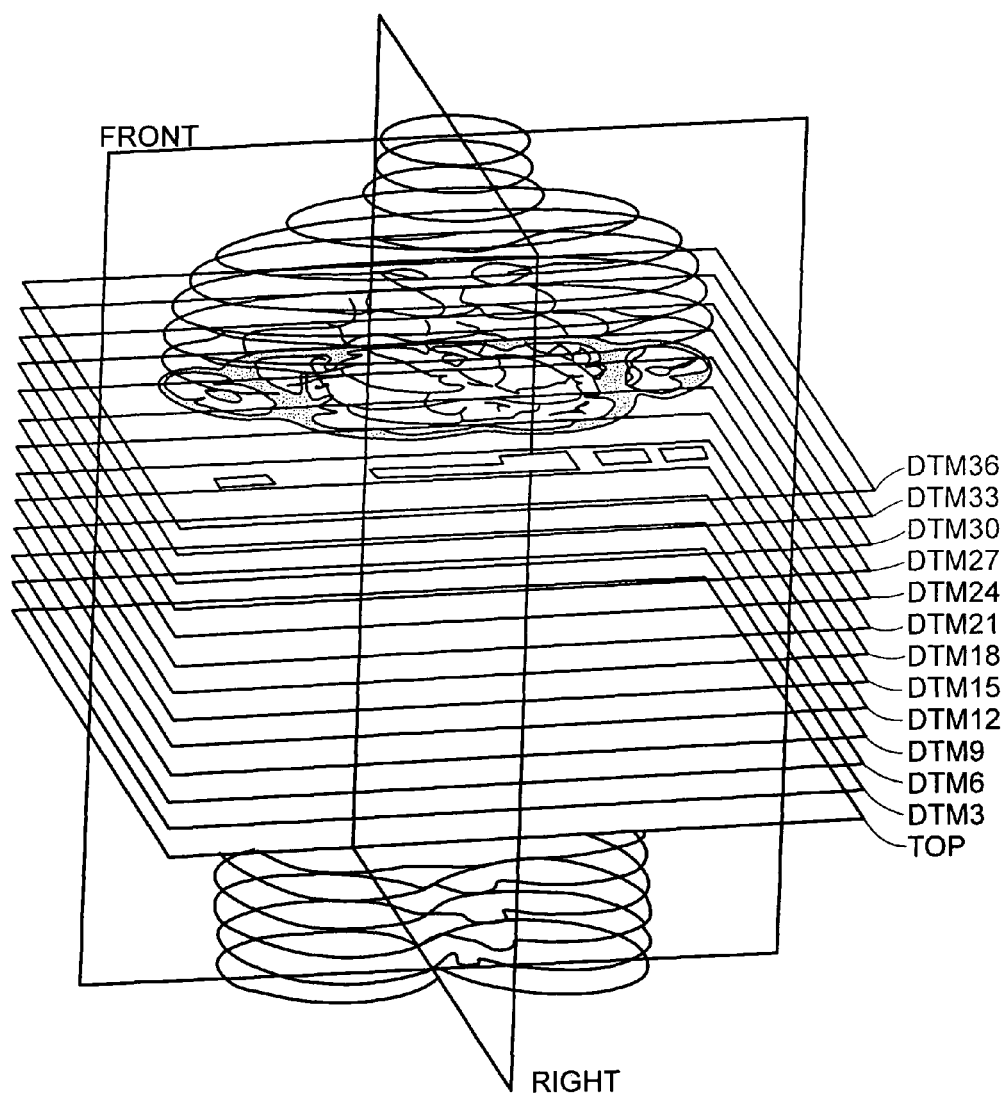

In an exemplary embodiment, the device in the shape of a synthetic torso is based on the 3D model of a typical male, which was segmented and reconstructed from the Visible Human Data of the National Library of Medicine (National Library of Medicine, *The Visible Human Project*: http://www.nlm.nih.gov/research/visible/visible_human.html) using transverse slices (FIG. 8) at an average of five-millimeter intervals (from section no. 4155 at sagittal-coronal coordinate z=463 voxel=154 mm to section no. 2048 at z-3190 voxel-1063 mm). This spans the entire torso including the thoracic, abdominal and pelvic regions. A manual segmentation method was used to define the outer body, pulmonary, and abdominal cavities in these image slices. The volume created for the abdominal cavity includes all the peritoneal and retroperitoneal organs. The 3D model was constructed using engineering design software, Pro/Engineer (PTC, Inc.). The model was used to design and fabricate negative molds for casting the synthetic torso, as depicted in FIG. 2. These were digitally manufactured of woodblocks as shown in FIG. 2a.

In order to provide a realistic support and structure for the body, respiratory motion, pulmonary motion and various other motions a synthetic skeleton 15 was placed within the molds prior to casting the torso (FIG. 3). A disposable abdominal wall 3 was cast in a separate mold.

In some embodiments, the disposable abdominal wall 3 presents a two layer structure (FIG. 4) having an inner layer 3a and an outer layer 3b. The two layers may be fabricated of the same or different materials. Preferably, the inner wall is fabricated of a highly elastic material, such as Cine Skin Silicone A/B with 50% part C (Elongation: 1000% (A/B+ 50% C), and the outer layer is fabricated of any of those materials described above for use in forming the outer housing (e.g. Cine Skin Silicone A/B).

Figure 5B:
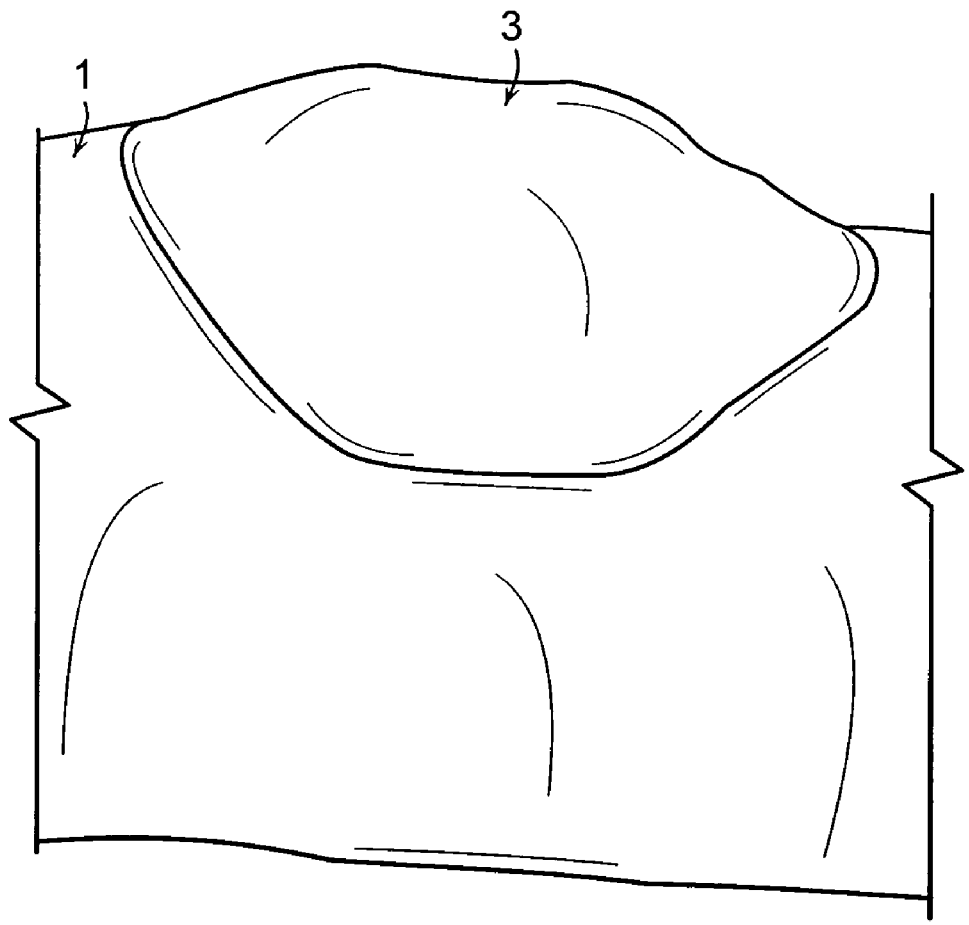

The disposable abdominal wall 3 is shown in FIG. 5b attached to the synthetic torso using a hook and loop fastener 16 (Velcro) on the boundary of the abdominal wall 3 and outer housing 1/synthetic torso. A lip and corresponding depression in the peripheries of the disposable wall and the synthetic torso can further be used to hold the disposable wall 3 in place. As shown, the disposable wall 3 is hermetically sealed over the torso with a closed strip 17. This fastening means allows for the insufflation of the abdominal cavity as depicted in FIG. 5b. As shown in FIG. 5a, six flexible tubes 14 are included next to the spine from the left and right retroperitoneal fossae and out through the neck to simulate blood and urine flow to the animal organs placed within the torso. However, any number of tubes may be used in a variety of locations. Preferably, however, the number of tubes and their placement is selected so as to closely mimic the actual human anatomy.

The present device, in the form of an outer housing 1 having any geometric shape or the shape of the corresponding anatomical structure (e.g. synthetic torso) provides a realistic approximation of an actual surgical procedure and provides surgeons, medical students and residents with a method for learning and practicing various procedures. In particular, the present device provides components that are designed to approximate the properties of the corresponding anatomical structures (e.g. the organs, tissues, abdominal wall). Further, the present device is designed to provide proper shape, proportion and structure of the corresponding anatomical structures. Still further, the present device incorporates means for simulating respiration, pulmonary action, circulation and the heart beat of a live anatomy, thereby mimicking the constant motion that the various parts of the human anatomy undergo. This motion is not particularly limited in its degrees of freedom, and the motion provided by the present device simulates the motion of a live body in its degrees of freedom.

Because laparoscopic procedures are performed through small incisions and often through laproscopic sleeves and/or tubes, the use of laparoscopic instruments is different than that in an open surgery. In particular, the skill required to perform laparoscopic surgery is more difficult than one might expect due to inverted manipulation, two-dimensional visualization, and the loss of direct touch. The lack of normal stereoscopic vision results in the loss of depth perception while "through the hole" slender instrument manipulation constrains motion capabilities. One of the surgeon's most important assets is a highly developed sense of touch. Laparoscopy, however, separate the surgeon's hands from the surgical site.

The laparoscopic simulators presently available present certain limitations. First, they do not provide the anatomic perspective of the procedure that is being performed. Further, such simulators do not allow for changing the orientation of the simulated body. Still further, such simulators do not allow for unrestricted placement and localization of trocars. Further, such simulators do not provide the force-feedback encountered in needle and trocar insertion. Due to these unrealistic characteristics, the simulators are only used at the beginning of the training programs for gaining basic laparoscopic skills.

Thus, the device of the present invention will provide a valuable training step that can be used alone and together with box simulators, live animal training, and mentored surgery.

In further embodiments, the present invention provides a device for training and evaluating radiological procedures. In particular, radiological procedures generally include X-ray, CT (Computed Tomography), MRI (Magnetic Resonance Imaging), Ultrasound, Nuclear Magnetic Resonance Imaging and Interventional Radiology. X-ray procedures is the oldest radiological procedure which uses a small amount of radiation on a selected part of the body to generate an image it is commonly used to generate images of the chest, musculoskeletal system and the gastrointestinal system. CT is similar to an X-ray except that CT imaging provides cross-sectional images of specific areas of the body. CT is mainly used for brain, neck, spine, chest, abdominal and musculoskeletal imaging. MRI is similar to CT except that MR imaging uses a magnet and radio waves to generate an image. MRI has been used to generate images of the brain, spinal cord, heart, bones, joints, soft tissues and blood vessels. Ultrasound uses sound waves passed through the body to generate an image and is typically used in prenatal care. Nuclear Magnetic Resonance Imaging uses small amounts of radioactive compounds to produce images that help in gathering information about the function of various organs. The radioactive compounds, called tracers, are helpful in evaluating bone, liver, heart, lung, brain, kidney or endocrine problems. Interventional Radiology uses catheters and coils to open obstructed vessels, drain areas where fluids have accumulated, relieve certain forms of hypertension, remove foreign objects and manage gastrointestinal bleeding without surgery.

The present invention provides a device that can be used in training and evaluating a variety of radiological procedures. In particular, as set forth above, the human body undergoes constant motion in multiple degrees of freedom. Thus, when training individuals in performing procedures, such as radiological procedures, and in practicing such procedures, it would be desirable to provide an accurate approximation of a live human body that possesses not only the physical properties of the human anatomy, but that also simulates the dynamic motion of the live human anatomy. The present invention provides such a device in the form of any geometric shape, a synthetic torso or other body part that is designed so as to simulate the proportion, structure, dynamic motion, and preferably the shape and various other properties of the corresponding human anatomy. Such features are discussed above. The device may further be designed so as to provide a user with radiological uses. Thus, for example, in training and/or practicing a Nuclear Magnetic Resonance Imaging procedure, a tracer may be implanted in the desired training/practice site (e.g. in the lungs). The synthetic torso, which presents the user with an accurate representation of the human anatomy (e.g. housing the lungs, surrounding organs, ribs, etc) and which simulates respiration and pulmonary motion (thereby providing lung motion) provides an accurate device on which an imaging procedure could take place.

Methods of the present invention comprise using the device to perform various laparoscopic procedures in a realistic manner. While the devices and methods are described, in particular, in relation to a synthetic torso used in performing laparoscopic procedures on the torso area, it is to be understood that the device could comprise various other body parts and, further, that various other types of laparoscopic procedures could be performed using such synthetic training devices. Still further, while the present device is described in connection with the human anatomy, it is also understood that the present devices could be modified so as to simulate other animal, preferably mammalian body parts, to provide anatomical structures and methods for use in training and evaluating individuals in laparascopic surgeries performed on any animal. Still further, while the devices have been described in particular with relation to laparoscopic procedures, the devices would also present beneficial training and evaluation devices on which individuals could perform any type of precise surgeries, particularly wherein motion of the organs and other body parts impacts the procedure.

The methods of the present invention will be further illustrated with reference to the following Examples which are intended to aid in the understanding of the present invention, but which are not to be construed as a limitation thereof.

EXAMPLE

The synthetic torso formed in accordance with FIGS. 2-6 and 8 was used and evaluated by medical students, residents, and attending urologists who compared it to the standard training box. The study showed that the synthetic torso gives a more realistic approximation of a real procedure and is particularly suited for laparoscopy training. Animal organs were used in the studies to allow for operating on real tissues. The organs were placed in situs, requiring appropriate instrument access and port placement. Further, induced respiration caused the organs to move as in a live human body.

The trainee underwent numerous steps, beginning with the insertion of the Veress needle, insufflating the $CO_2$, determining the port sites and placing the trocars. The trainee then performed a variety of laparoscopic procedures that necessitated dissecting and developing tissue planes, excising and reconstructing tissue, suturing, electrocautering, and performing other surgical maneuvers in an anatomically consistent setting. The synthetic torso provided the possibility of placing an animal kidney in the retroperitomeum for the trainee to operate on realistic tissues, thus simulating various surgeries such as renal biopsy, pyeloplasty, nephrectomy and even parial nephrectomy.

Tests were run to determine whether the design of the simulator impacts the subsequent performance of the trainee. Studies were performed by comparing self evaluation and trainer scores of a group of subjects randomized to laparoscopic training with either a standard box simulator or the synthetic torso of the present invention. Twenty five medical students, residents, and attending urologists particupated in the study. A 15 minute instructional presentation given by a fellow provided a basic overview of laparoscopic surgery and described and demonstrated the tasks to be practiced. The participants were then randomized and allowed to work for two hours, during which the fellow was present to provide assistance.

Figure 6A:
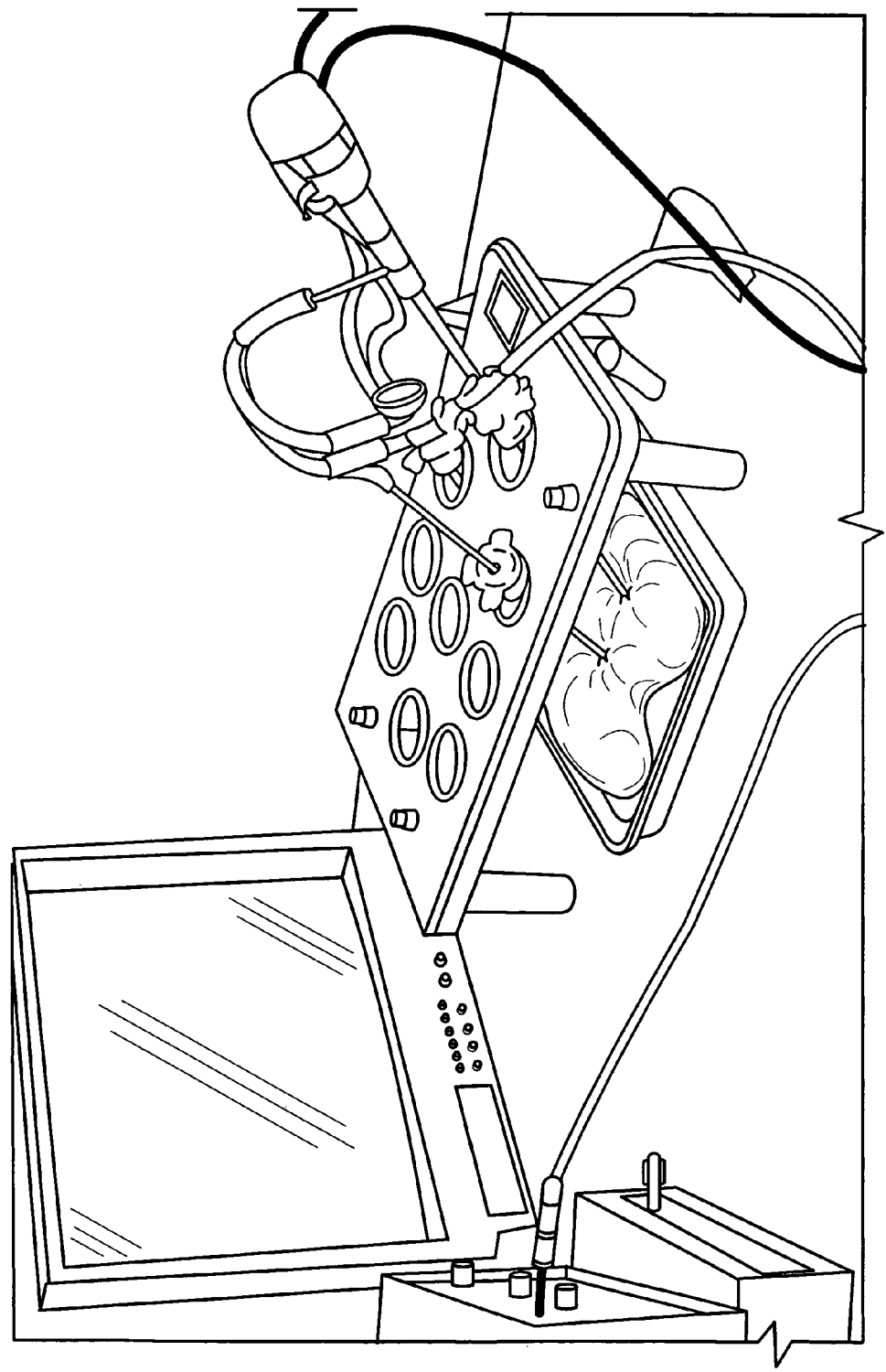
FIG. 6a-b shows the setup used to perform the example, wherein (a) shows a box-simulator and (b) shows a synthetic torso in accordance with one embodiment.

In the case of the laparoscopic training box case, shown in FIG. 6A, a 10 mm port (USSC) was placed in the middle for camera access. Ports of 5 mm and 10 mm (USSC) were placed for instructional access. A large plastic Petri dish was used to support and immobilize a porcine kidney within the box.

Figure 6B:
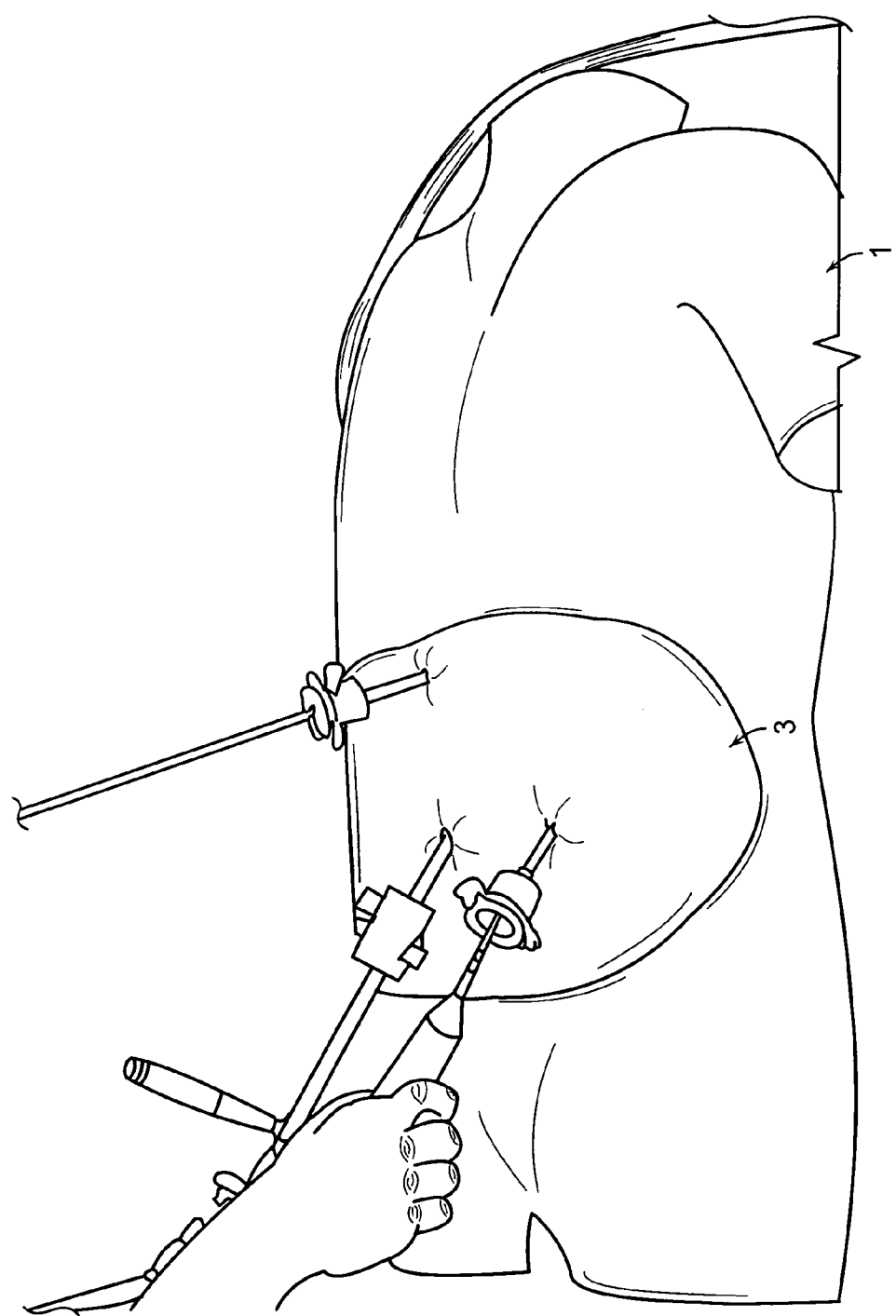

With the synthetic torso, shown in FIG. 6B, a 10 mm port was placed at the umbilicus for camera access. A second 10 mm trocar 4 cm lateral to the umbilicus at the mid-axillary line, and a 5 mm port 4 cm superior to the umbilicus were placed for instrument access. A porcine kidney was placed in the abdominal cavity in the left retroperitoneal fossa. A standard video cart was utilized for both simulators and 10 mm and 30° laparoscopes were connected to the camera and a light source (Stryker Instruments, Santa Barbara, Calif.).

The laparoscope and camera were held and manipulated by another participant for both the box simulator and the synthetic torso. The following tasks were performed: trocar placement, instrument selection and manipulation, needle and suture manipulation, suturing and intracorporal knot tying.

After each session, the participants were asked to complete a questionnaire identifying the training model, the exercises performed, and the instructor. The questionnaire also queried the level of education and prior surgical experience of the subject. The subjects ranked their responses from "poor" to "excellent", and from "strongly disagree" to "strongly agree". Participants also had the opportunity to provide written comments, suggestions and critiques. The questionnaires were then converted to an analog scale by assigning "strongly disagree" and "poor" a value of 1 and "strongly agree" and "excellent" a value of 5. The results were stratified by the simulator used. A mean and standard deviation were then calculated for each question. The means were compared and p-values calculated using student's standard t-test. All statistical computations were performed using STATA. Our level of statistical significance was 0.05. The following Table 1 summarizes the statistical results for the questions asked in the survey.

TABLE 1

Summary Statistics of Survey Results

| | | Box Simulator | | Synthetic Torso Simulator | | |
|---|---|---|---|---|---|---|
| | | Mean | SD | Mean | SD | P value |
| Trainer Evaluation | Ease of Use | 2.9 | 0.73 | 4.0 | 0.95 | 0.008 |
| | Approximation of Anatomy | 1.8 | 1.1 | 4.1 | 0.57 | <0.001 |
| | Internal View | 2.7 | 1.3 | 4.3 | 0.65 | <0.001 |
| | Overall | 2.9 | 1.3 | 4.3 | 0.49 | 0.002 |
| Trainer Design | Importance of Anatomy | 4.0 | 1.1 | 4.7 | 0.49 | 0.064 |
| | External Appearance | 3.1 | 1.3 | 3.8 | 1.0 | 0.150 |
| | Trainer Port Placement | 2.9 | 1.1 | 4.2 | 0.72 | 0.500 |

TABLE 1-continued

Summary Statistics of Survey Results

| | | Box Simulator | | Synthetic Torso Simulator | | |
|---|---|---|---|---|---|---|
| | | Mean | SD | Mean | SD | P value |
| Skills Lab | Instrument Training | 3.6 | 0.97 | 4.1 | 0.90 | 0.239 |
| | Port Placement Training | 3.1 | 1.3 | 4.0 | 0.77 | 0.069 |
| | Suturing | 3.7 | 1.1 | 4.1 | 0.66 | 0.314 |
| | Knot Tying | 3.5 | 1.3 | 4.1 | 0.79 | 0.203 |
| Instructor Evaluation | Introduction | 4.5 | 0.70 | 4.3 | 0.77 | 0.608 |
| | Definition of Goals | 4.1 | 1.1 | 4.3 | 0.86 | 0.724 |
| | Technique Description | 3.8 | 1.4 | 4.2 | 0.83 | 0.455 |
| | Assistance | 4.0 | 1.3 | 4.6 | 0.67 | 0.198 |

Based on these results, the synthetic torso was significantly easier to use, provides a better approximation of the real anatomy and provided a better internal view (p=0.008, <0.001, and <0.001, respectively). The participants also felt that it was a better design (p=0.002). Moreover, participants in both groups agreed or strongly agreed that approximating real anatomy was important and that port placement was important for training (p=0.064 and 0.500, respectively).

It was found that training utilizing the devices of the present invention effectively decreases errors in the operating room and teaches the trainee additional skills. The natural human body configuration allows the trainee to experience the correct spatial representation and distribution of trocars as are normally found in the human abdomen during laparoscopic surgery. The mixed synthetic/animal model with induced respiratory motion of the organs renders a more realistic model compared with existing box simulators.

All documents mentioned herein are incorporated herein by reference in their entirety.

The foregoing description of this invention is merely illustrative thereof, and it is understood that variations and modifications can be made without departing from the spirit or scope of the invention as set forth in the following claims.

What is claimed is:

1. A medical training and/or evaluation device comprising:
an outer housing in the shape of at least a portion of a mammalian anatomy, the outer housing including one or more upper walls corresponding to an abdominal wall of a live mammal, wherein the outer housing is capable of being opened and sealed repeatedly in order to enable a user to add and/or remove synthetic organ or tissue elements as desired according to a procedure;
an abdominopelvic cavity and a thoracic cavity within the outer housing corresponding to the abdominopelvic cavity and thoracic cavity of the live mammal;
an interior wall positioned between the abdominopelvic cavity and thoracic cavity corresponding to the diaphragm of the live mammal;
one or more synthetic organ or tissue elements corresponding to organ or tissue elements of the live mammal, the synthetic organ or tissue elements disposed within the abdominopelvic cavity and/or thoracic cavity so as to simulate the organ or tissue element placement in the live mammal;
one or more tubes positioned within the outer housing and being in connection with one or more synthetic organ or tissue elements so as to simulate one or more pathways through which respiration occurs within the live mammal;
a respirator in connection with the one or more tubes to simulate respiration within the device;
the one or more synthetic organ or tissue elements being interconnected with each other and/or being connected to one or more cavity walls with one or more fastening means that provide the same type of motion as the corresponding anatomic connection means such that the one or more synthetic organ or tissue elements are provided with the degrees of freedom of the corresponding organ or tissue element within the live mammal,
wherein the outer housing, the one or more walls, and the interior wall are configured such that they are movable in response to the simulated respiration, wherein the outer housing, the one or more walls, and the interior wall move as a result of the simulated respiration in a manner that simulates motion of the exterior of the portion of the mammalian anatomy, the abdominal wall, and the diaphragm during respiration in the live mammal; and
wherein the one or more synthetic organ or tissue elements are further configured such that the one or more synthetic organ and tissue elements move as a result of the simulated respiration in a manner that simulates the motion the corresponding organ and tissue elements during respiration in the live mammal.

2. The device of claim 1 wherein the device further includes apparatus that simulates involuntary motion by the live mammal, wherein the outer housing, the one or more walls, the interior wall, and the one or more synthetic organ or tissue elements move as a result of the simulated involuntary motion in a manner that simulates the motion of the corresponding exterior of the portion of the mammalian anatomy, abdominal wall, diaphragm and organ or tissue elements during involuntary motion in the live mammal.

3. The device of claim 1 wherein the device further includes apparatus in connection with one or more synthetic organ or tissue elements that simulates pulmonary action, wherein the outer housing, the one or more walls, the interior wall, and the one or more synthetic organ or tissue elements move as a result of the simulated pulmonary action in a manner that simulates the motion of the corresponding exterior of the portion of the mammalian anatomy, abdominal wall, diaphragm and organ or tissue elements during pulmonary action in the live mammal.

4. The device of claim 1 wherein the simulated respiration exerts on the synthetic organ or tissue element a force with a plurality of degrees of freedom.

5. The device of claim 1 wherein the housing corresponds to a shape that simulates a human torso.

6. The device of claim 1 wherein the one or more synthetic organ or tissue elements are interconnected, connected or supported within the at least one cavity by one or more water balloons, one or more string-like materials, and/or one or more hinge-like fasteners.

7. The device of claim 1 wherein the housing comprises a skeletal system within the housing.

8. The device of claim 1 wherein the one or more walls are configured for performing a simulated laparascopic procedure through the one or more walls.

9. The device of claim 8 wherein the one or more walls are fabricated of a material that allows insufflation.

10. The device of claim 1 wherein the outer housing, cavity walls, one or more walls, interior wall, and one or more synthetic organ or tissue elements are fabricated of materials that simulate the texture, tensile properties and elastomeric properties of the corresponding body portions one or more organ and or tissue elements of the live mammal.

11. The device of claim 1 wherein the device is adapted for training and/or evaluation of radiological procedures.

12. A training and/or evaluation device for use in medical procedures comprising:
- an outer housing in the shape of at least a portion of a mammalian anatomy, the outer housing including one or more upper walls corresponding to an abdominal wall of a live mammal, wherein the outer housing is capable of being opened and sealed repeatedly in order to enable a user to add and/or remove synthetic organ or tissue elements as desired according to a procedure;
- an abdominopelvic cavity and a thoracic cavity within the outer housing corresponding to the abdominopelvic cavity and thoracic cavity of the live mammal;
- an interior wall positioned between the abdominopelvic cavity and thoracic cavity corresponding to the diaphragm of the live mammal;
- one or more synthetic organ or tissue elements corresponding to one or more organ or tissue elements of the mammal, the one or more synthetic organ or tissue elements disposed within the abdominopelvic cavity and/or thoracic cavity and supported within the abdominopelvic cavity and/or thoracic cavity, interconnected with each other, and connected to one or more cavity walls with one or more fastening means that provide the same type of motion as the corresponding anatomic support and connection means so as to limit the degrees of freedom of the one or more organ or tissue elements, wherein the degrees of freedom of the one or more organ or tissue elements simulate the degrees of freedom of the organ or tissue element within the live mammal;
- the outer housing and one or more synthetic organ or tissue elements being fabricated of materials that simulate the texture, tensile properties and elastomeric properties of the corresponding body portions and one or more organ or tissue elements of the live mammal; and
- apparatus for simulating respiration and/or pulmonary action on the synthetic organ or tissue element, the outer housing, the one or more walls, and the interior wall;
- wherein the outer housing, the one or more walls, and the interior wall are configured such that they are movable in response to the simulated respiration, wherein the outer housing, the one or more walls, and the interior wall are in constant motion as a result of simulated respiration and/or pulmonary action in a manner that simulates motion of the exterior of the portion of the mammalian anatomy, the abdominal wall, and the diaphragm during respiration and/or pulmonary action in the live mammal; and
- wherein the one or more synthetic organ or tissue elements simulate the dynamic atmosphere within the live mammal such that the one or more synthetic organ or tissue elements are in constant motion as a result of simulated respiration and/or pulmonary action, and wherein the constant motion simulates the constant motion of the one or more organ or tissue elements during respiration and/or pulmonary action in the live mammal.

13. The device of claim 12 wherein the one or more upper walls are removable wall elements through which a simulated laparoscopic procedure can proceed.

14. The device of claim 13 wherein the one or more upper walls are adapted to allow for insufflation within the housing.

15. The device of claim 13 wherein the one or more upper walls are pierceable with laparoscopic instruments.

16. The device of claim 12 further comprising apparatus to simulate at least in part a circulatory system, urinary system, or digestive system.

17. The device of claim 12 further comprising a skeletal system within the outer housing, wherein the outer housing is formed by molding, and wherein the skeletal system is disposed within the mold prior to molding.

18. A method for training and/or evaluating a medical procedure comprising:
- providing a training device according to claim 1; and
- causing respiration to be simulated within the device, wherein the outer housing, the one or more walls, and the interior wall move as a result of the simulated respiration in a manner that simulates motion of the exterior of the portion of the mammalian anatomy, the abdominal wall, and the diaphragm during respiration in the live mammal, and
- wherein the one or more synthetic organ or tissue elements move as a result of the simulated respiration in a manner that simulates the one or more organ and tissue elements during respiration in a live mammal.

19. The method of claim 18 further comprising, after causing respiration to be simulated within the device, inserting a laparoscope and one or more laparoscopic instruments into the outer housing and performing a laparoscopic procedure.

20. The method of claim 18 further comprising imaging the one or more synthetic organ or tissue elements with radiation.

21. The method of claim 18 wherein the device further comprises apparatus to simulating a circulatory system, urinary system and/or digestive system and the method further comprises, prior to inserting a laparoscope and laparoscopic instruments into the outer housing, and causing the circulatory system, urinary system and/or digestive system to be simulated within the device.

22. The method of claim 21 wherein the outer housing, one or more walls, interior wall, and one or more synthetic organ or tissue elements move as a result of such simulation in a manner that mimics the motion of the corresponding exterior of the portion of the mammalian anatomy, abdominal wall, diaphragm, and organ or tissue elements during action by the circulatory system, urinary system and/or digestive system in a live body.

23. A method for training and/or evaluating a radiological procedure comprising the steps of:
- providing a training and/or evaluation device according to claim 1;
- causing respiration to be simulated within the device, wherein the outer housing, one or more walls, interior wall, and one or more synthetic organ or tissue elements simulate the dynamic atmosphere within a live mammal such that the outer housing, one or more walls, interior wall, and one or more synthetic organ or tissue elements are in constant motion as a result of such simulated respiration and/or pulmonary action, and wherein the constant motion simulates the constant motion of the live mammal during respiration and/or pulmonary action; and
- performing a radiological procedure.

24. A medical training and/or evaluation device comprising:
- an outer housing in the shape of at least a portion of a mammalian anatomy, the outer housing including one or more upper walls corresponding to an abdominal wall of a live mammal, wherein the outer housing is capable of being opened and sealed repeatedly in order to enable a user to add and/or remove synthetic organ or tissue elements as desired according to a procedure;
- an abdominopelvic cavity and a thoracic cavity within the outer housing corresponding to the abdominopelvic cavity and thoracic cavity of the live mammal;

an interior wall positioned between the abdominopelvic cavity and thoracic cavity corresponding to the diaphragm of the live mammal;

one or more synthetic organ or tissue elements corresponding to organ or tissue elements of a live mammal, the organ or tissue elements disposed within the abdominopelvic cavity and/or thoracic cavity so as to simulate the organ or tissue element placement in the live mammal; one or more tubes positioned within the outer housing and being in connection with one or more synthetic organ or tissue elements so as to simulate one or more pathways through which respiration occurs within the live mammal;

a respirator in connection with the one or more tubes to simulate respiration within the device;

the one or more synthetic organ or tissue elements being interconnected with each other and/or being connected to one or more cavity walls with one or more fastening means that provide the same type of motion as the corresponding anatomic connection means such that the one or more synthetic organ or tissue elements are provided with the degrees of freedom of the corresponding organ or tissue element within the live mammal, wherein the outer housing, the one or more walls, and the interior wall are configured such that they are movable in response to the simulated respiration, wherein the outer housing, the one or more walls, and the interior wall move as a result of the simulated respiration in a manner that simulates motion of the exterior of the portion of the mammalian anatomy, the abdominal wall, and the diaphragm during respiration in the live mammal;

wherein the one or more synthetic organ or tissue elements are further configured such that the one or more synthetic organ or tissue elements move as a result of the simulated respiration in a manner that simulates the motion of the corresponding organ or tissue elements during respiration in the live mammal; and wherein the one or more synthetic organ or tissue elements are interconnected, connected or supported within the at least one cavity by one or more water balloons, one or more string-like materials, and/or one or more hinge-like fasteners.

* * * * *